(12) United States Patent
Minemura

(10) Patent No.: US 7,738,332 B2
(45) Date of Patent: Jun. 15, 2010

(54) REPRODUCTION METHOD, OPTICAL DISK DRIVE, AND IC CIRCUIT

(75) Inventor: Hiroyuki Minemura, Kokubunji (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 1254 days.

(21) Appl. No.: 11/236,742

(22) Filed: Sep. 28, 2005

(65) Prior Publication Data

US 2006/0262687 A1 Nov. 23, 2006

(30) Foreign Application Priority Data

May 20, 2005 (JP) ............................. 2005-147491

(51) Int. Cl.
  *G11B 20/14* (2006.01)
  *G11B 7/00* (2006.01)
(52) U.S. Cl. .............. 369/53.11; 369/47.53; 369/53.34; 369/53.27; 369/59.11
(58) Field of Classification Search .............. 369/59.22, 369/59.11, 53.45, 47.53, 47.37, 47.5, 53.34
  See application file for complete search history.

(56) References Cited

U.S. PATENT DOCUMENTS 7,046,600 B2 * 5/2006 Matsumoto ............... 369/47.53
7,339,872 B2 * 3/2008 Ogura ..................... 369/59.22

FOREIGN PATENT DOCUMENTS

| EP | 0 758 784 A2 | 2/1997 |
|---|---|---|
| JP | 63-018523 | 1/1988 |
| JP | 09-055030 | 2/1997 |
| JP | 11-149679 | 6/1999 |
| JP | 11-296987 | 10/1999 |
| JP | 2002-298514 | 10/2002 |
| JP | 2006-164332 | 6/2006 |

* cited by examiner

*Primary Examiner*—Tan X Dinh
*Assistant Examiner*—Kim-Kwok Chu
(74) *Attorney, Agent, or Firm*—Antonelli, Terry, Stout & Kraus, LLP.

(57) ABSTRACT

In an optical disk drive that is equipped with a binarization circuit by the PRML method and carries out record/reproduction at a speed higher than a standard speed, to realize reproduction compatibility between the drive and another optical disk drive by the ordinarily adopted direct slice method. It can be realized by applying verification judgment equivalent to reproduction at a standard speed in accordance with a reproduction speed. More specifically, it is realized by counting 2 T data number by the direct slice method, using a Viterbi decoder that validates a run length shorter than the minimum run length, and adopting other measures. A higher record/reproduction speed is realized while reproduction compatibility, which is an important original function of an interchangeable optical disk, is secured.

5 Claims, 38 Drawing Sheets

FIG. 25
CASE-1:SAMPLIG IS ASYNCHRONOUS TO DATA EDGES (1/2 CLOCK PERIOD DELAYED)
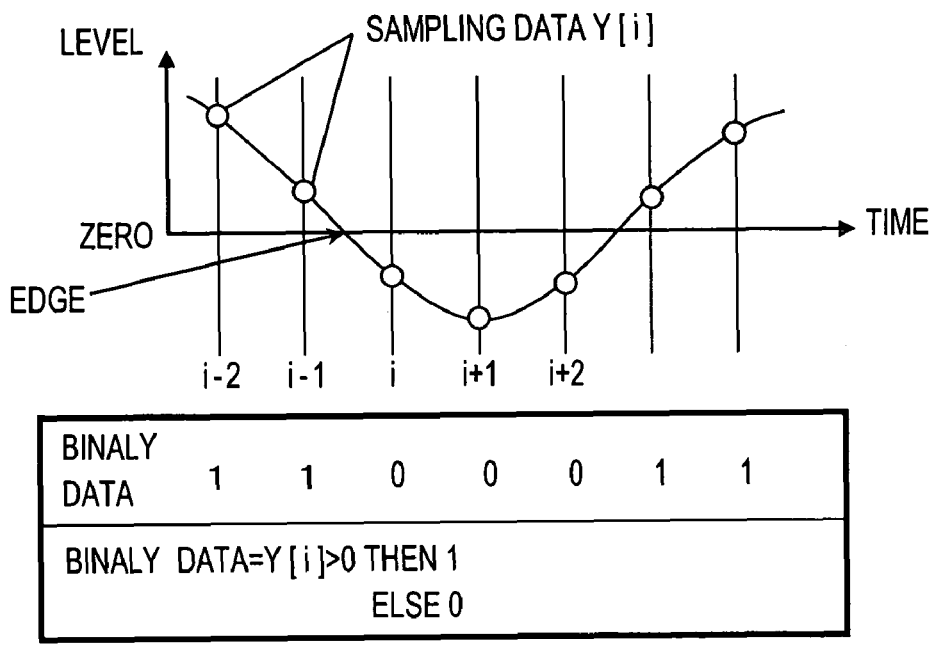
CASE-2:SAMPLIG TIMING IS SYNCHRONOUS TO DATA EDGES
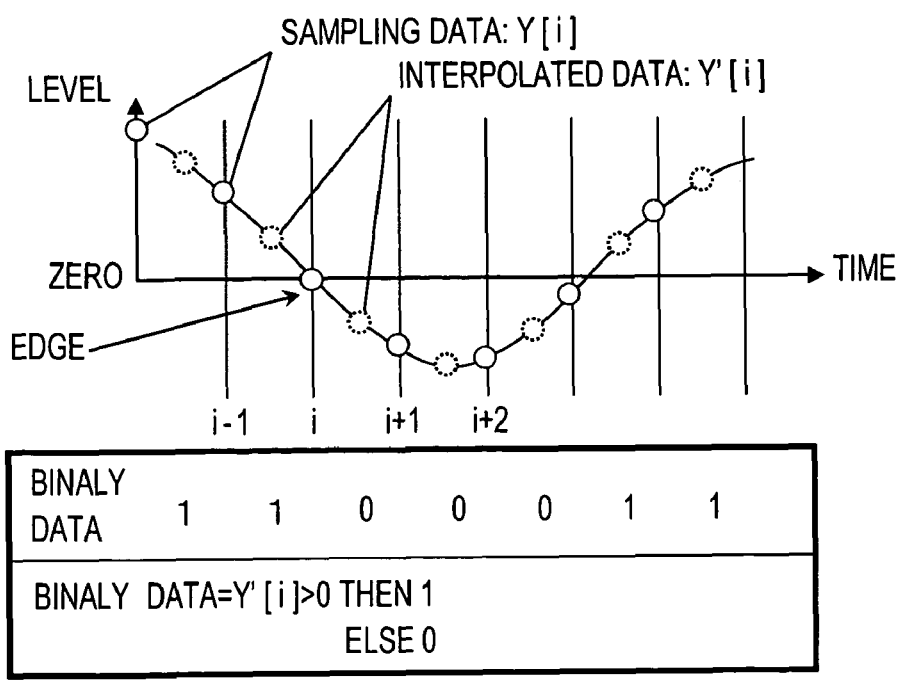

FIG. 31

CODE : RLL(2,10)
CLASS : PR(3,4,4,3)
NORMALIZATION : ±1
MARK : BIT "1" & LOW LEVEL

| NO. | BIT ARRAY | | | | DATA READ | | VERIFY | |
|---|---|---|---|---|---|---|---|---|
| | | | | | VALID | TARGET LEVEL | VALID | TARGET LEVEL |
| 0 | 0 | 0 | 0 | 0 | YES | 1.00 | YES | 1.00 |
| 1 | 0 | 0 | 0 | 1 | YES | 0.57 | YES | 0.57 |
| 2 | 0 | 0 | 1 | 0 | NO | - | NO | - |
| 3 | 0 | 0 | 1 | 1 | YES | 0.00 | YES | 0.00 |
| 4 | 0 | 1 | 0 | 0 | NO | - | NO | - |
| 5 | 0 | 1 | 0 | 1 | NO | - | NO | - |
| 6 | 0 | 1 | 1 | 0 | NO | - | YES | -0.14 |
| 7 | 0 | 1 | 1 | 1 | YES | -0.57 | YES | -0.57 |
| 8 | 1 | 0 | 0 | 0 | YES | 0.57 | YES | 0.57 |
| 9 | 1 | 0 | 0 | 1 | NO | - | YES | 0.14 |
| 10 | 1 | 0 | 1 | 0 | NO | - | NO | - |
| 11 | 1 | 0 | 1 | 1 | NO | - | NO | - |
| 12 | 1 | 1 | 0 | 0 | YES | 0.00 | YES | 0.00 |
| 13 | 1 | 1 | 0 | 1 | NO | - | NO | - |
| 14 | 1 | 1 | 1 | 0 | YES | -0.57 | YES | -0.57 |
| 15 | 1 | 1 | 1 | 1 | YES | -1.00 | YES | -1.00 |

(a) AVERAGE EDGE SHIFTS IN CASE OF THE DVD-RAM STANDARD EQUALIZATION (b) AVERAGE EDGE SHIFTS IN CASE OF THE DVD-RAM STANDARD EQUALIZATION AND COMPENSATED BY A 15-TAP FIR FILTER.

FIG. 37

| TAP | 2X | 4X | 6X | 8X | 10X | 12X | 14X | 16X |
|---|---|---|---|---|---|---|---|---|
| -7 | 0 | -0.040 | -0.059 | -0.052 | -0.051 | -0.048 | -0.034 | -0.037 |
| -6 | 0 | 0.022 | 0.061 | 0.044 | 0.043 | 0.028 | 0.002 | 0.009 |
| -5 | 0 | 0.037 | 0.020 | 0.039 | 0.053 | 0.062 | 0.071 | 0.068 |
| -4 | 0 | -0.069 | -0.091 | -0.099 | -0.117 | -0.122 | -0.114 | -0.139 |
| -3 | 0 | -0.004 | 0.007 | -0.002 | -0.018 | -0.022 | -0.017 | 0.009 |
| -2 | 0 | 0.087 | 0.105 | 0.122 | 0.149 | 0.168 | 0.176 | 0.211 |
| -1 | 0 | -0.035 | -0.041 | -0.043 | -0.025 | -0.023 | -0.020 | -0.045 |
| 0 | 1 | 0.909 | 0.907 | 0.899 | 0.892 | 0.908 | 0.909 | 0.890 |
| 1 | 0 | 0.073 | 0.062 | 0.073 | 0.047 | 0.015 | -0.012 | -0.005 |
| 2 | 0 | 0.135 | 0.151 | 0.184 | 0.215 | 0.241 | 0.227 | 0.218 |
| 3 | 0 | -0.107 | -0.083 | -0.112 | -0.091 | -0.065 | -0.032 | -0.028 |
| 4 | 0 | -0.130 | -0.157 | -0.191 | -0.224 | -0.251 | -0.218 | -0.176 |
| 5 | 0 | 0.138 | 0.098 | 0.133 | 0.112 | 0.088 | 0.057 | 0.044 |
| 6 | 0 | 0.037 | 0.102 | 0.083 | 0.104 | 0.122 | 0.091 | 0.052 |
| 7 | 0 | -0.054 | -0.082 | -0.079 | -0.089 | -0.099 | -0.085 | -0.071 |

FIG. 38
| W/R SPEED | 1st WRITE | 10 TIMES OVERWRITE |
|---|---|---|
| 6X | 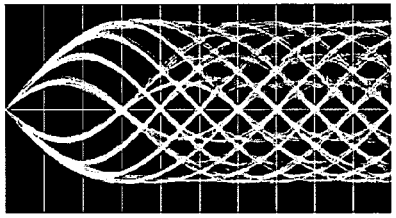 | 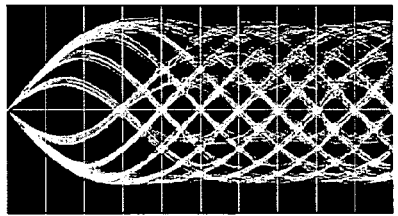 |
| bER | $< 1 \times 10^{-7}$ | $2 \times 10^{-7}$ |
| 16X | 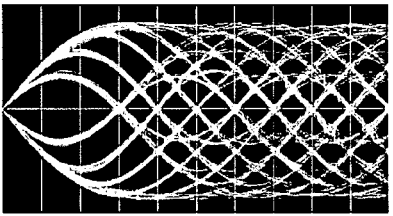 | 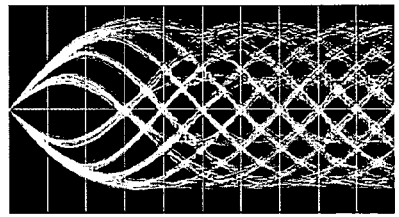 |
| bER | $< 1 \times 10^{-7}$ | $4 \times 10^{-7}$ |
(*)BIT ERROR RATES WERE MEASURED USING PRML CHANNEL

FIG. 41

SPECIFICATION OF 2T-ROW-ERROR COUNTER (1) EVENT COUNTER IN SECTORS

| | SECTOR 0 | SECTOR 1 | SECTOR 2 | ... | SECTOR 15 | TOTAL |
|---|---|---|---|---|---|---|
| COUNTER BIT | 10 BIT | ↓ | ↓ | | ↓ | 16 BIT |
| MOMORY I/O | YES | ↓ | ↓ | | ↓ | ↓ |

(2) EVENT COUNTER IN PI FRAMES

| | FRAME 0 | FRAME 1 | FRAME 2 | ... | FRAME 207 | TOTAL |
|---|---|---|---|---|---|---|
| COUNTER BIT | 8 BIT | ↓ | ↓ | | ↓ | 16 BIT |
| MOMORY I/O | NOT NEEDED | ↓ | ↓ | | ↓ | YES |

(3) THRSHOLD VALUE AND 2T-ROW-ERROR COUNTER REGISTER

| | THRESHOLD | 2T-ROW-ERROR FRAME COUNT |
|---|---|---|
| COUNTER BIT | 10 BIT | 8 BIT |
| MOMORY I/O | YES | YES |

REPRODUCTION METHOD, OPTICAL DISK DRIVE, AND IC CIRCUIT

CLAIM OF PRIORITY

The present application claims priority from Japanese application JP 2005-147491 filed on May 20, 2005, the content of which is hereby incorporated by reference into this application.

CROSS REFERENCE TO RELATED APPLICATIONS

U.S. patent application Ser. Nos. 10/933,321 and 11/092,872 are co-pending applications of this application. The contents of which are incorporated herein by cross-reference.

FIELD OF THE INVENTION

The present invention relates to an optical disk drive that forms record marks the physical properties of which are different from other parts on a recording medium and records information, a method for reproducing the information recorded in the medium, and an IC circuit.

BACKGROUND OF THE INVENTION

Optical disks are widely used in the forms of CDs and DVDs, the development of a next generation optical disk using blue laser has been advancing, and such an optical disk has been required to have a larger capacity. In addition, a super multi-drive, wherein a single optical disk drive has the functions of not only the replay of a CD but also the replay of a CD and a DVD and the record/replay of a CD-R/RW, DVD-RAM and DVD-R/RW, has been commercialized and is considered to be a mainstream product in future.

An optical disk medium has to be retrieved from an optical disk drive and replayed with another drive. To that end, when data is recorded with a single optical disk drive, the processing for judging the quality of the recorded data called verification is applied in many cases in order to confirm that the recorded data can be reproduced with another drive. Data for error correction using a Reed-Solomon code or the like is added to the data recorded in an optical disk medium so that the data is correctly reproduced by applying error correction processing to cope with the defects of the optical disk medium, the degradation of the optical disk drive with age, and the like. In verification processing, it is the common practice to: count the number of error correction when the recorded data is reproduced; judge whether or not there is an appropriate allowance in the correction capability; and thus judge whether or not the quality of the recorded data is good. The appendix M of JIS X6243, one of the DVD-RAM specifications, shows the guideline of the verification with an allowance in the error correction capability and the method called the replacement or alternation processing of a sector when the quality of the recorded data is judged to be insufficient as a result of the verification.

In an optical disk drive and an optical disk medium, the record/replay speed thereof is also increasing simultaneously with the aforementioned larger capacity thereof, and an optical disk drive that can record/replay at a speed 52 times faster in the case of a CD-R and 16 times faster in the case of a DVD±R than a standard speed has also been commercialized.

When the reproduction speed of an optical disk drive is increased, jitter appears and the quality of the reproduced data such as an S/N ratio deteriorates. This is, as generally known, because the influence of the circuit noise represented by amplifier noise increases in accordance with the increase of the speed. Further, as is also commonly known, an optical disk medium, such as a CD-R or a DVD-R, of a write-once type using an organic coloring matter has the same reflectance as a read-only memory type medium such as a CD-ROM or a DVD-ROM and therefore is comparatively hardly affected by amplifier noise. In contrast, a rewrite type medium using a phase-change material has a lower reflectance than the above mediums and therefore is strongly affected by amplifier noise.

A direct slice method and a PRML (Partial Response Maximum Likelihood) method are generally employed as a method for binarizing a regenerative signal of an optical disk. The PRML method is excellent in improving an S/N ratio and hence widely used as the means of securing the higher speed and larger capacity of a magnetic disk. The PRML method is a method that binarizes a regenerative signal to form a most probable bit string while comparing the specific regenerative signal at the time N in the consecutive regenerative signals with a target signal. The Viterbi decoding method, one of the ML methods, is widely used since it can drastically reduce the circuit size. The direct slice method has been used from the past as a method of replaying an optical disk, but it is obvious that the method has limitation on the increase of the speed and capacity. For that reason, the PRML method has been applied also as the reproduction means of an optical disk. However, even the Viterbi decoding method requires a larger circuit size than the direct slice method. In this light, the standardization of CDs and DVDs is based on the direct slice method and most of the previous generation optical disk drives employ the direct slice method.

A rewrite type optical disk is strongly required to have a higher speed. In the case of a DVD-RAM in particular, recorded data can instantly be verified and hence the verification at the same speed as the recording is necessary for securing the performance of an optical disk drive. In an optical disk drive that records and reproduces data at a high speed on such a rewrite type optical disk, it is necessary to employ the PRML method in order to improve the S/N ratio. It is also necessary at the same time to assure the reproducibility of data with a previous generation optical disk drive employing the direct slice method.

As an example of the PRML method for an optical disk, JP-A No. 296987/1999 discloses the technology of adaptively tracking the target signal level of a Viterbi decoder in conformity with a regenerative signal level.

As an example of an optical disk drive employing both the binarizing methods of the PRML method and the direct slice method, JP-A No. 298514/2002 discloses the configuration of an optical disk drive wherein a signal subjected to PR equalization processing is binarized on the basis of the expected level of an edge.

Further, JP-A No. 149679/1999 discloses the technology of processing verification with an optical disk drive employing the PRML method by observing a regenerative signal during the record of data and simultaneously observing both the response from the data recorded at the last minute and the response of the signal reproduced at the same time as the record.

SUMMARY OF THE INVENTION

As stated above, an object of the present invention is to provide a technology that assures that an optical disk recorded with an optical disk drive that employs the PRML method and is capable of high speed record/reproduction is reproducible with a previous generation optical disk drive that employs the direct slice method. FIG. 2 is a view schematically showing the problem to be solved by the present invention. This is the case where, although an optical disk recorded with a novel high-performance drive is reproducible with a novel drive, reproduction error occurs when the optical disk is replayed with a conventional low-performance drive. The possibility of causing such a problem of reproduction compatibility increases when a novel drive records data under the conditions that facilitate the reproduction with the novel drive itself.

A conventional technology has hardly been able to process verification properly in response to a higher speed and has not been able to assure the reproduction compatibility and prevent unnecessary record error and alternation processing from occurring.

Another object of the present invention is to provide a reproduction method that is applicable to an optical disk drive employing the PRML method and being capable of high-speed record/reproduction and allows appropriate verification, and an optical disk drive that employs the reproduction method.

Note that, the present invention is discussed here on the basis of a regenerative signal having the minimum run length of 3 T which is used in DVDs and CDs, and therefore the minimum run length is 3 T unless otherwise specified. Since the discussion can easily be expanded to a system, such as a Blu-ray Disc, having the minimum run length of 2 T, the descriptions related to the application of the present invention to such a system are omitted except a particularly important case.

Firstly, the studied items are hereunder explained prior to the explanations on the configuration of the present invention itself.

Studied hereunder is whether or not the above problem can be solved by combining the conventional technology of employing both the PRML method and the direct slice method disclosed in JP-A No. 298514/2002 with the conventional verification method shown in the appendix M of JIS X6243. Here, since the verification method disclosed in JP-A No. 298514/2002 is not based on the number of the error correction described in JIS X6243 and thus does not assure the compatibility of an optical disk such as a DVD, it is not included in the following study.

Here, the verification standard recommended in JIS X6243 is briefly summarized. In a DVD format, two kinds of error correction frames comprising PI and PO exist and, in each of the frames, data for correction is added as parity data to user data and recorded in an optical disk. The attention is focused on the PI frame in the verification process. The PI frame is configured so that the parity data of 10 bytes is added to the user data of 172 bytes. A Reed-Solomon code is used for error correction and error correction up to 5 bytes and error detection up to 10 bytes can be performed in one PI frame. The case wherein error of 4 bytes or more occurs in the PI frame is hereunder referred to as "row error." 208 pieces in total of PI frames exist in one data block comprising 32 KB user data, and the quality of the data block is judged to be insufficient to assure the reproduction compatibility when the number of row error is eight or more. Then the case of such judgment is hereunder referred to as "verification error." The verification standard described here is applicable to the whole data block, but another verification standard exists in the case of a DVD-RAM. In a DVD-RAM, the judgment for each sector comprising 2 KB user data is also applied in the case of primary verification called initializing or certifying. In this case, when the number of row error is six or more in a sector, namely in 13 successive PI frames, the sector is judged to be defective and alternation processing is applied to the sector.

In the case of a PO frame which is another error correction frame, though details are not discussed here, parity data is added to the data perpendicular to a PI frame and the PO frame has error correction capability withstanding burst error. Because of such a configuration, even when error correction is impossible in a PI frame, user data can be reproduced by the error correction using a PO frame. The concept of the verification standard in the above recommended method means that we may consider that error correction can almost be performed only by PI frames and the error correction capability of PO frames is secured as the allowance for reproduction compatibility.

The present invention is further explained hereunder, unless otherwise specified, on the premise that the verification processing is applied at each data block.

FIG. 3 shows a simulation model of a regenerative signal of an optical disk used in the study. Basically, a regenerative signal is obtained by: computing the step response of an optical head by using an optical simulator for scalar diffraction computation; and overlapping the computed step response with the signal code to be recorded by convolution integral. With regard to disk noise, the noise component is superimposed as an S/N ratio onto the signal code and, with regard to amplifier noise, it is added to the signal after convolution. Thereby a false signal that takes the aberration of the head, the disk noise and the amplifier noise separately into consideration can be produced.

FIG. 4 shows a simulation result on the relationship between the read speed and jitter of a DVD-RAM medium. The above simulation model was used and the computation was carried out by setting disk noise at −23 dB and amplifier noise at −34 dB at a double speed in the case of a DVD on the basis of actual measurement values. It is assumed that the amplifier noise is a noise having flat frequency response, so-called a white noise, and increases in proportion to the increment of the band responding to the read speed. From the figure, it is understood that the value of jitter increases in accordance with the read speed. As the equalization of waveform necessary for regenerative signal processing, the method of direct current component correction and the parameters described in JIS X6243 were used as they were in the computation. However, it is assumed that for example the band of the direct current component correction increases in proportion to the read speed.

FIG. 5 shows the relationship between jitter and PI error. The PI frame is one of the two error correction codes of a DVD as is generally known. The PI error is the number of the PI frames that are subjected to error correction or incapable of error correction out of the 208 PI frames in one block. From the figure, it is understood that, in the case of the signals of an identical jitter value, the number of the PI error in the PRML method is smaller than that in the direct slice method. The PRML method used here is a PR(3,4,4,3)ML class method generally used for a DVD and the result is based on the signals not subjected to PR equalization processing in order to compare the PRML method with the direct slice method. By applying PR equalization processing, further improvement of performance can be expected. The PRML method described in the present invention is based on the above conditions unless otherwise specified. As stated above, by using the PRML method, it becomes possible to reduce the occurrence of error even when a jitter value increases due to the increase of the read speed. In the range of the figure where the jitter value is 15% to 20%, it may be judged that the quality of the recorded data is good since the number of the error correction is small in the case of the reproduction by the PRML method. However, when the data is reproduced by the direct slice method, there may be a high degree of the danger that the number of the error correction increases considerably and the reproduction is impossible. Therefore, it is difficult to assure the reproduction compatibility even though verification processing is applied by using only the PRML method.

FIG. 6 is a block diagram showing a reproduction system to carry out verification processing. The reproduction system includes the technology employing both the PRML method and the direct slice method disclosed in JP-A No. 298514/2002 and a demodulation circuit to realize the error correction method described in JIS X6243. The overall configuration comprises: an analog signal processor 10 including a waveform equalization circuit; a digital signal processor 20 including a Viterbi decoder; a format decoder 30 having the functions of the demodulation of a run length limited code and error correction processing; and a verify unit 40 to realize verification processing. The verify unit 40 is composed of a direct-slice binarizer 45 having the function of direct slice and a format decoder-246 having the same function as the format decoder 30. In the configuration, at the time of usual data reproduction, the regenerative signal 50 reproduced with an optical head not shown in the figure is: subjected to the processing of waveform equalization, direct current component correction, amplitude correction and others with the analog signal processor 10; binarized with the Viterbi decoder in the digital signal processor 20; thereafter subjected to the demodulation of a run length limited code and error correction processing with the format decoder 30; and transferred to a host computer or the video processing part of a video recorder through an interface circuit not shown in the figure. On the other hand, when verification is performed, binarization processing is applied with the direct-slice binarizer 45 in the verify unit 40, error correction processing is applied with the format decoder 46 and simultaneously information on the occurrence of correction is measured, and the signal quality is judged on the basis of the information. By using such a configuration, it becomes possible to carry out binarization by the direct slice method at the time of verification processing and therefore the recorded data that has been judged to be good as a result of the verification judgment can be reproduced with another optical disk drive. However, as shown in FIG. 4, when the record/reproduction speed is increased, the jitter value increases and at the same time the number of PI error also increases. Therefore, if it is attempted to apply the standard recommended in JIS X6243 to the verification, the standard is too strict to assure the reproduction compatibility and record error and alternation processing occur very often with the aforementioned optical disk drive.

In succession to the above study results, the configuration of the present invention is hereunder explained on the basis of the simulation results.

In an optical disk drive allowing high speed record/reproduction, the rotation speed of an optical disk has an upper limit in order to secure a stable rotation speed and thus a rotation speed control method of a CAV (Constant Angular Velocity) mode or a derivative mode thereof is used. In such a case, even in a single optical disk medium, the record/reproduction speed varies from a radial location to another radial location, for example, the speed is low at an inner circumference and high at an outer circumference. As stated above, the magnitude of the influence of amplifier noise changes in accordance with the change of the reproduction speed and therefore the jitter value also changes. Appropriate verification means that an allowance necessary and sufficient for error correction capability is secured when reproduction is carried out at a standard speed by the direct slice method. As a consequence, the gist of the present invention is, even when the reproduction speed is high, to apply binarization equivalent to the direct slice method and change the judgment standard of verification in proportion to the jitter value and S/N ratio changing in accordance with the reproduction speed. Thereby, verification judgment equivalent to that in the case where binarization is carried out at a standard speed by the direct slice method can be secured and the object of the present invention can be achieved.

Next, the gist of the present invention is hereunder explained further concretely.

Firstly, the feature of the PRML method for an optical disk is explained. In the PRML method, a first bit string which has a constraint length or the length called a class bit number and a second bit string which has a target signal level corresponding to the first bit string and corresponds to the target signal level wherein the deviation from the regenerative signal is minimum are output as a result of binarization. A bit string of one bit shorter than a constraint length is called a state. Processing for transition at one time is carried out through transition processing from a state to the next state. In this case, there are basically two states at one time before the transition to the next state, and the basic procedure is to select from the two states only the state having a smaller integrated quantity (metric value) of the square of the difference between a target signal corresponding to the bit string relevant to each of the two states and the regenerative signal in the process (path) to transit into the aforementioned next state. If only one path out of the two paths is valid due to the limitation of the run length, transition is uniquely carried out without depending on the result of the comparison between the two integrated quantities of the squares of the differences. The code used in a DVD is a run length limited code having the minimum run length of 3 T. Therefore, in the PRML method for the replay of the DVD, the bit string wherein the run length is 1 T or 2 T is excluded beforehand. Thereby, it becomes possible to improve the performance so that a binarized result without run length limitation is not output and simultaneously to reduce the circuit size.

In contrast, in the case of the direct slice method, the limitation of the minimum run length as stated above is not applied and generally the signal of the minimum run length has the smallest amplitude and a small S/N ratio and hence most of error is caused by the error of the binarization of the minimum run length signal.

Such difference in the characteristic related to the limitation of the minimum run length is one of the important ones among the differences between the direct slice method and the PRML method and is a large obstacle to the realization of the reproduction compatibility.

The simplest method is, in the configuration of FIG. 6, to change the judgment standard of row error for verification in accordance with a reproduction speed. For example, when the threshold value is eight at a standard speed, the judgment standard may be set at 20 in the case of six times faster and 150 in the case of sixteen times faster. This is the first means for solving the problem. More specifically, the means comprises the following processes. Firstly, an error correction code is added to data and thereafter the data block is recorded with a run length limited code. Successively, the judgment standard of row error is changed in accordance with the reproduction speed and the process comprises the processes of:

(1) obtaining a regenerative signal by optically reproducing a recorded data block;
(2) obtaining a binarized data signal by binarizing the regenerative signal;
(3) obtaining a byte data string by decoding the binarized data signal with a run length limited code;
(4) after reconfiguring the byte data string into error correction frames, applying error correction processing with a Reed-Solomon code, and counting a corrected byte number $N_{frm}$ for each of the error correction frames;
(5) counting the total number of the error correction frames wherein the corrected byte number $N_{frm}$ is a first threshold value or more in the data block as an error frame number $N_{tot}$; and
(6) judging that the quality of the data block is insufficient when the error frame number $N_{tot}$ is a second threshold value or more, wherein the quality of the recorded data is judged in accordance with a reproduction speed by changing at least one of the first and second threshold values in accordance with the reproduction speed. However, when the configuration shown in FIG. 6 is used as it is, two format decoders are required. Since the circuit is of a very large size, it is unrealistic to newly add a circuit for verification. Thus it is necessary to count the number of error correction incidence with another simple circuit from the results of the binarization by a method equivalent to the direct slice method.

FIG. 7 represents the simulation result showing the relationship between the number of PI error and the number of the incidence of the 1 T and 2 T data formed in a block in the case of a DVD-RAM. From the figure, it is understood that, in the range where the PI error number is up to about 100, the PI error number is nearly identical to the count number of the 2 T data. This is, as stated above, caused by the fact that the 3 T signal of the minimum run length is the main cause of the binarization error. The count of the number of the incidence of the data not limited by run length can be realized with a circuit of a far smaller size than the size of a format decoder. In the case of a DVD, it is enough if attention is focused particularly on 2 T.

As stated above, it is possible to realize appropriate verification conforming to a reproduction speed by: counting the number of 2 T data by the direct slice method; thereby approximately counting the error correction number; and changing the judgment standard of the 2 T count number in accordance with the reproduction speed. Further, it is possible to equivalently count the row error number with 2 T data by counting the number of the 2 T data for each zone having the same length as a PI frame. Such expansion is appropriate from the viewpoint of securing an allowance of error correction capability. Meanwhile, in the aforementioned means for solving the problem, the count of error incidence depends on an error correction code and is restricted up to 10 bytes for each PI frame in the case of a DVD. In contrast, in the means of counting the number of 2 T data, the count of error incidence does not depend on an error correction code and hence the degree of freedom in setting the judgment standard increases. In an optical disk drive that has to select parts of large amplifier noise for cost reduction, the increase of the degree of freedom is very advantageous. In addition, since it is possible to apply error correction processing by using the result of the binarization by the PRML method and count the row error number in parallel, it is also possible to realize verification processing by synthesizing both the judgment results. This is the second solution. A first example of the second solution comprises the detailed processes of:

(1) obtaining a regenerative signal by optically reproducing a recorded data block;
(2) obtaining a first binarized data signal by binarizing the regenerative signal by the Viterbi decoding method;
(3) obtaining a byte data string by decoding the first binarized data signal with a run length limited code;
(4) after reconfiguring the byte data string into error correction frames, applying error correction processing with a Reed-Solomon code, and obtaining error correction information;
(5) obtaining a second binarized data signal by binarizing the regenerative signal by the direct slice decoding method; and
(6) obtaining from the second binarized data signal the run length error incidence information which is the number of the incidence of the data having at least the length of $(L_{min}-1)$ out of the lengths shorter than the minimum run length $L_{min}$ of the run length limited code, wherein the quality of recorded data is judged on the basis of the error correction information and the run length error incidence information.

Further, a second example of the second solution is to judge a recorded data quality by using ECC error and the sum of $N_{tot}$ and $E_{tot}$ and comprises the processes of:
(1) obtaining a regenerative signal by optically reproducing a recorded data block;
(2) obtaining a first binarized data signal by binarizing the regenerative signal by the Viterbi decoding method;
(3) obtaining a byte data string by decoding the first binarized data signal with a run length limited code;
(4) after reconfiguring the byte data string into error correction frames, applying error correction processing with a Reed-Solomon code, and counting a corrected byte number $N_{frm}$ for each of the error correction frames;
(5) counting the total number of the error correction frames wherein the corrected byte number $N_{frm}$ is a first threshold value or more in the data block as an error frame number $N_{tot}$;
(6) obtaining a second binarized data signal by binarizing the regenerative signal by the direct slice decoding method;
(7) counting from the second binarized data signal the number of the incidence of the data having at least the length of $(L_{min}-1)$ out of the lengths shorter than the minimum run length $L_{min}$ of the run length limited code as a run length error incidence number $E_{frm}$ for each zone having the same length as the error correction frame;
(8) counting the total number of the zones wherein the run length error incidence number $E_{frm}$ is a second threshold value or more in the data block as a run length error frame number $E_{tot}$; and
(9) judging that the quality of the data block is insufficient when the sum of the error frame number $N_{tot}$ and the run length error frame number $E_{tot}$ is a third threshold value or more, wherein the quality of the recorded data is judged in accordance with a reproduction speed by changing at least one of the first to third threshold values in accordance with the reproduction speed.

Further, a third example of the second solution is to synthetically judge a recorded data quality by using ECC judgment and the 2 T number judgment and comprises the processes of:
(1) obtaining a regenerative signal by optically reproducing a recorded data block;
(2) obtaining a first binarized data signal by binarizing the regenerative signal by the Viterbi decoding method;
(3) obtaining a byte data string by decoding the first binarized data signal with a run length limited code;

(4) after reconfiguring the byte data string into error correction frames, applying error correction processing with a Reed-Solomon code, and counting a corrected byte number $N_{frm}$ for each of the error correction frames;

(5) counting the total number of the error correction frames wherein the corrected byte number $N_{frm}$ is a first threshold value or more in the data block as an error frame number $N_{tot}$;

(6) exercising a first judgment wherein the result is regarded as "true" when the error frame number $N_{tot}$ is a second threshold value or more;

(7) obtaining a second binarized data signal by binarizing the regenerative signal by the direct slice decoding method;

(8) counting from the second binarized data signal the number of the incidence of the data having at least the length of ($L_{min}$–1) out of the lengths shorter than the minimum run length $L_{min}$ of the run length limited code as a run length error incidence number $E_{frm}$ for each zone having the same length as the error correction frame;

(9) counting the total number of the zones wherein the run length error incidence number $E_{frm}$ is a third threshold value or more in the data block as a run length error frame number $E_{tot}$;

(10) exercising a second judgment wherein the result is regarded as "true" when the run length error frame number $E_{tot}$ is a fourth threshold value or more; and

(11) judging that the quality of the data block is insufficient when at least one of the first and second judgment is "true,"

wherein the quality of the recorded data is judged in accordance with a reproduction speed by changing at least one of the first to fourth threshold values in accordance with the reproduction speed.

FIG. 8 represents a simulation result showing the relationship between jitter and PI error. The difference of FIG. 8 from FIG. 5 is that the data of the PRML method wherein 2 T data is validated is added in the case of FIG. 8. It is understood that, by excluding 2 T data from the run length limitation, it is possible to obtain the characteristics equal to those of the direct slice method even when the PRML method is used. The switching of the run length limitation can be executed easily. As stated above, in the ordinary PRML method for a DVD, the bit string including 2 T data is excluded from a circuit configuration. Hence, when a bit string including 2 T data is incorporated in a circuit and state transition including the 2 T data is executed, an effective measure is to judge the magnitude of the cumulative amount of the square of error and simultaneously to prepare a switch for forcibly invalidating the state transition including the 2 T data regardless of the result of the judgment. Thereby, by operating the switch, it is possible to realize the PRML method having variable run length limiting function wherein the output of the 2 T data is invalidated at the time of ordinary reproduction and validated at the time of verification. The above explanation seems to be complicated but, when an optical disk the minimum run length of which is 2 T, such as a Blu-ray Disc (BD), is widely used and an optical disk drive capable of record/reproduction of CD/DVD/BD is commercialized, presumably the minimum run length switching method is generally used. This measure is the third solution.

The third solution comprises the detailed processes of:

(1) obtaining a regenerative signal by optically reproducing a recorded data block;

(2) obtaining a binarized data signal by binarizing the regenerative signal by the Viterbi decoding method;

(3) obtaining a byte data string by decoding the binarized data signal with a run length limited code;

(4) after reconfiguring the byte data string into error correction frames, applying error correction processing with a Reed-Solomon code, and counting a corrected byte number $N_{frm}$ for each of the error correction frames;

(5) counting the total number of the error correction frames wherein the corrected byte number $N_{frm}$ is a first threshold value or more in the data block as an error frame number $N_{tot}$; and (6) judging that the quality of the data block is insufficient when the error frame number $N_{tot}$ is a second threshold value or more, wherein the Viterbi decoding method is, as the internal state, provided with a bit string containing the data string having at least the length of ($L_{min}$–1) out of the lengths shorter than the minimum run length $L_{min}$ of the run length limited code and the quality of the recorded data is judged in accordance with a reproduction speed by changing at least one of the first and second threshold values in accordance with the reproduction speed.

The means of solving the problem is explained above. In order to deepen the understanding of the present invention, the above explanations are summarized below.

(1) Gist of the Present Invention

The gist of the present invention is to execute binarization equivalent to the direct slice method even when a reproduction speed is high and to change the judgment standard of verification to a necessary extent in accordance with the reproduction speed.

(2) Concrete Means for Solution (2-1) The method of executing binarization by the direct slice method and appropriately changing the judgment standard of row error in accordance with a reproduction speed. The size of the circuit tends to increase and the number of detected error in a PI frame is limited by an error correction code.

(2-2) The method of executing binarization by the direct slice method and counting the number of data not conforming to the run length limitation. In the case of a DVD, attention may be focused only on 2 T data and the size of an additional circuit can be reduced. Further, by detecting the number of 2 T data for each PI frame zone, it is possible to equivalently count the number of row error. In this case, since the number of row error can be counted regardless of an error correction code, the degree of freedom in setting a standard responding to a speed increases. In addition, it is possible to execute verification judgment in an integrated manner from the results of the binarization by the PRML method and the count of the row error number.

(2-3) The method of executing binarization by the PRML method to validate data not conforming to the run length limitation and appropriately changing the judgment standard of row error in accordance with a reproduction speed. The method is easily applied to an optical disk drive conforming to CD/DVD/BD. The number of detected error in a PI frame is limited by an error correction code.

As explained above, the present invention makes it possible to realize a reproduction method of executing appropriate verification in order to realize reproduction compatibility of an optical disk recorded with an optical disk drive capable of high speed record/reproduction with a previous generation optical disk drive employing the direct slice method, and an optical disk drive thereof.

BRIEF DESCRIPTION OF THE DRAWINGS

FIG. 25 comprises schematic views showing the concept of a pseudo-direct slice binarizer.

FIG. 31 is a table summarizing the internal state of a Viterbi decoder capable of switching the minimum run length in accordance with an RLL(2,10) code.

FIG. 37 is a table summarizing the tap coefficients of an FIR filter for reproduction correction at each speed.

FIG. 38 is a table showing the results of measuring a jitter value and a bit error rate at a 6×-speed and a 16×-speed.

FIG. 41 comprises tables showing the examples of the specification of a 2 T-row-error counter.

DETAILED DESCRIPTION OF THE PREFERRED EMBODIMENTS

The present invention is hereunder explained in detail referring to embodiments.

First Embodiment (Reproduction Method)

Experiment was carried out with an evaluator and a sample medium conforming to a 16×-speed DVD-RAM in order to examine the effectiveness of the aforementioned verification method of the present invention. The record was done at a 6x-speed, the reproduction was done by using the center track out of the five consecutive tracks while the reproduction speed and tilt conditions were changed, and jitter, PI error, the number of row error, the number of 2 T data, and others were measured.

Figure 9:
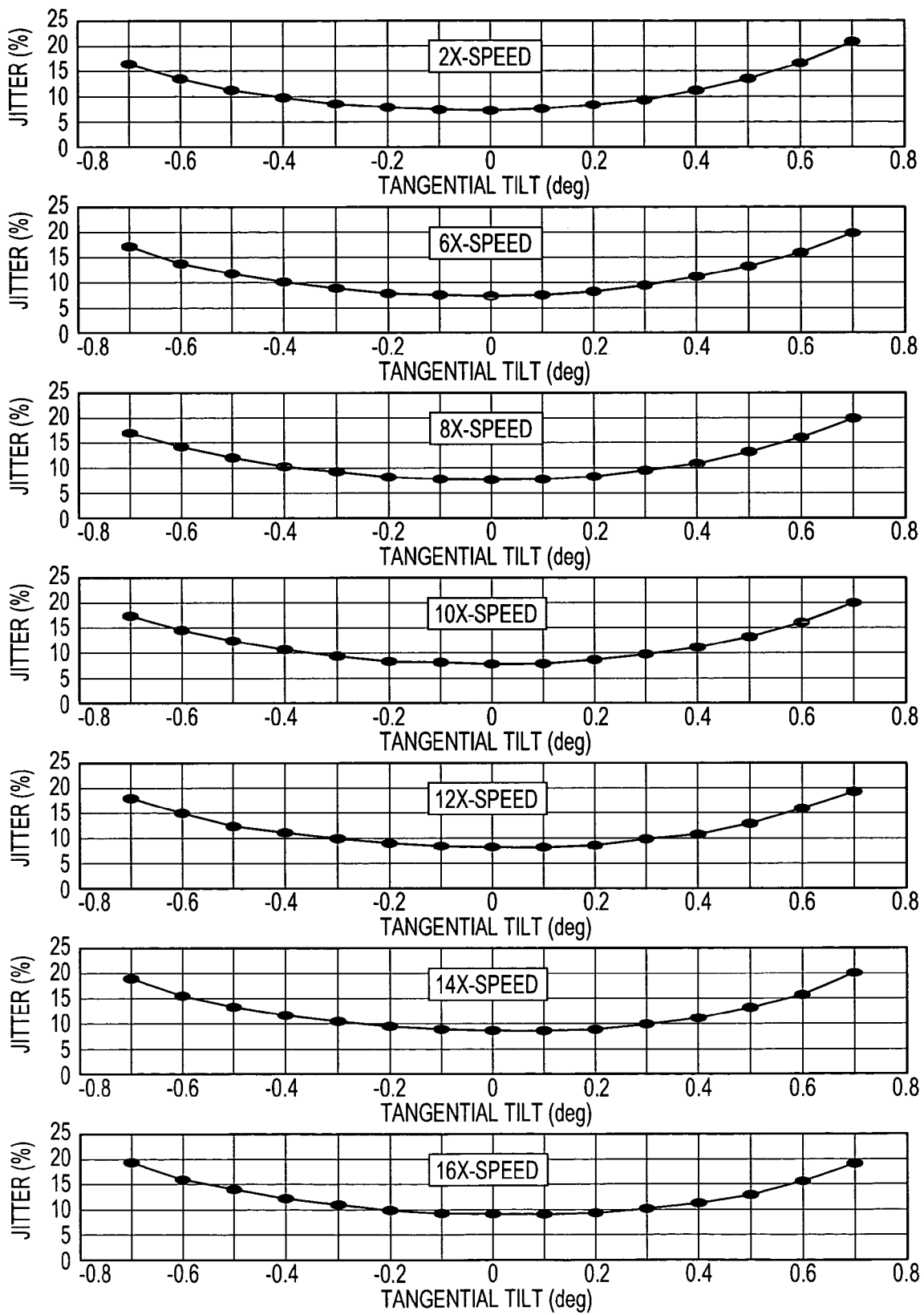
FIG. 9 comprises graphs showing the actual measurement results of the relationship between tangential tilt and a jitter value.
Figure 10:
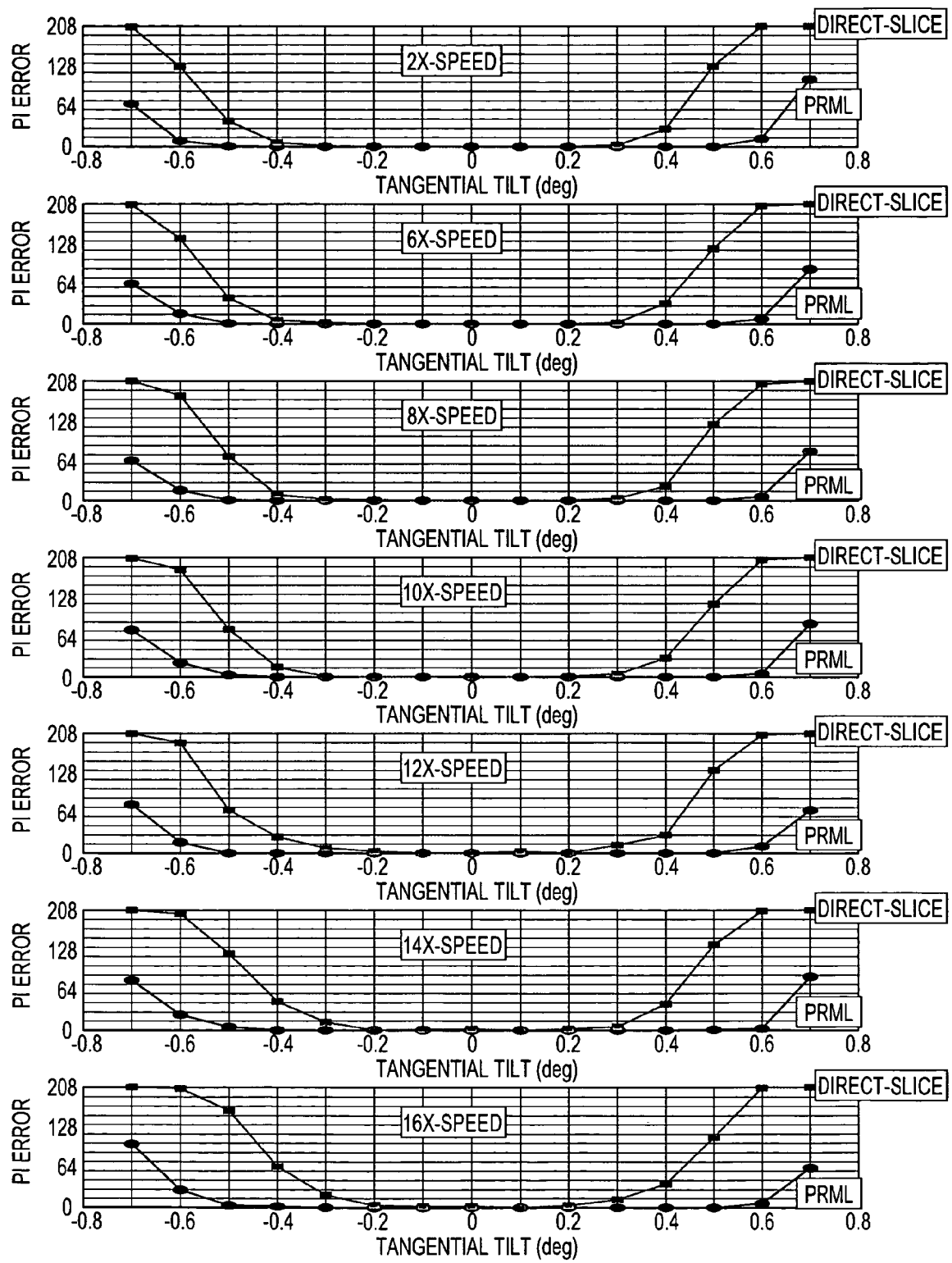
FIG. 10 comprises graphs showing the actual measurement results of the relationship between tangential tilt and PI error.
Figure 11:
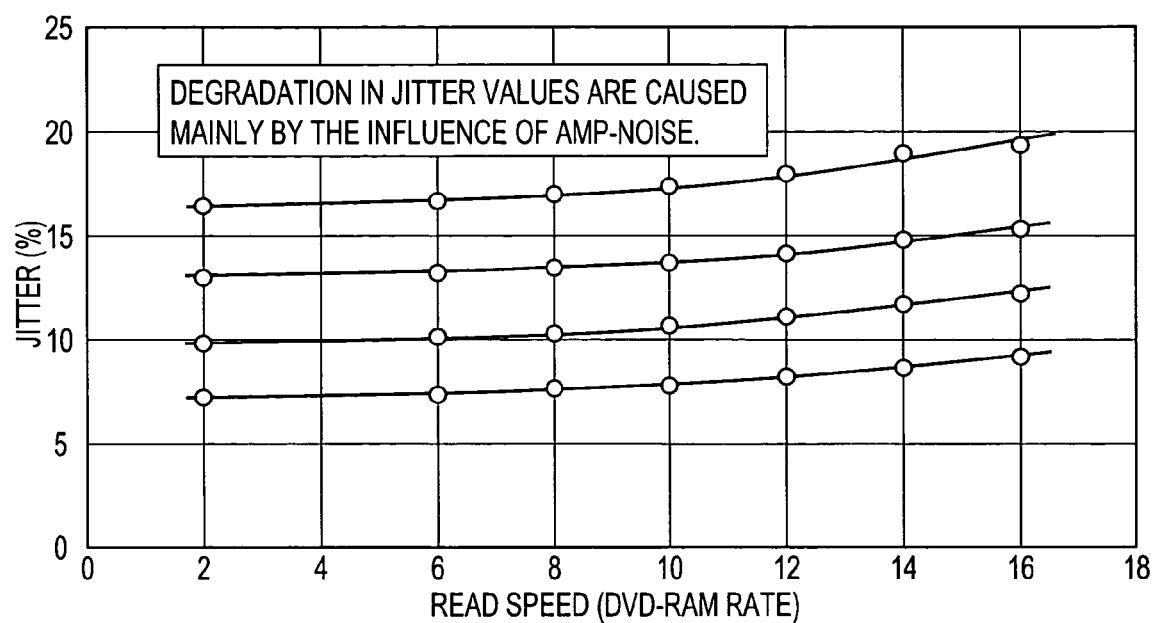
FIG. 11 is a graph showing the actual measurement results of the relationship between a read speed and a jitter value.
Figure 12:
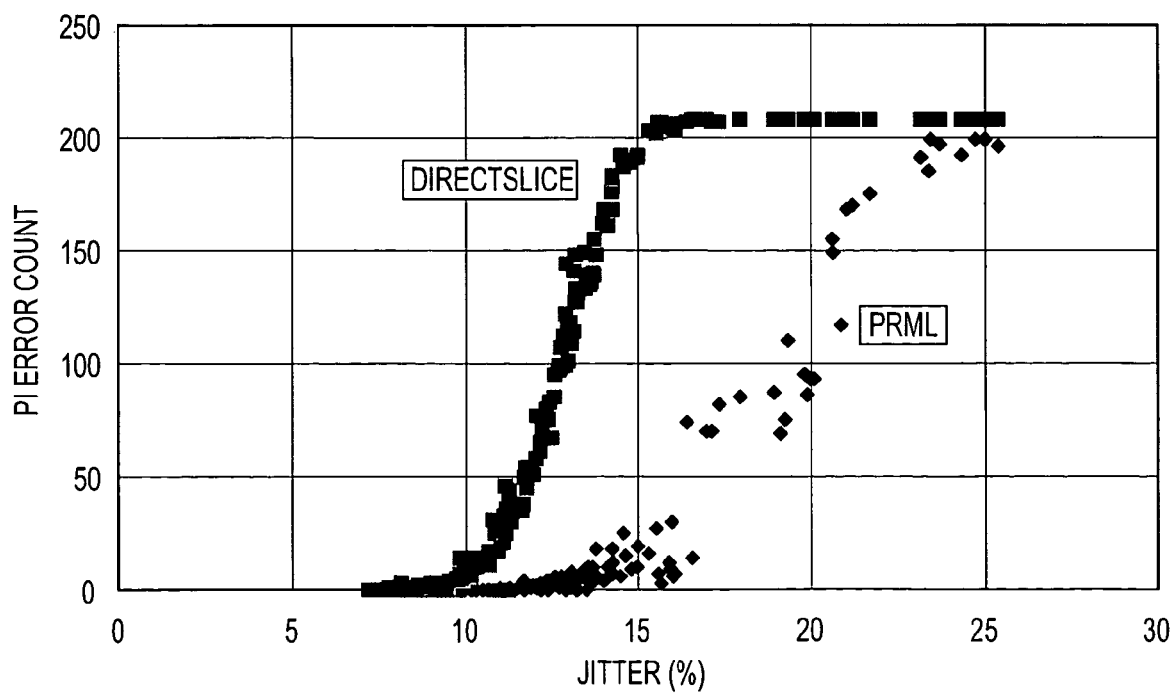
FIG. 12 is a graph showing the actual measurement results of the relationship between a jitter value and the number of PI error.
Figure 13:
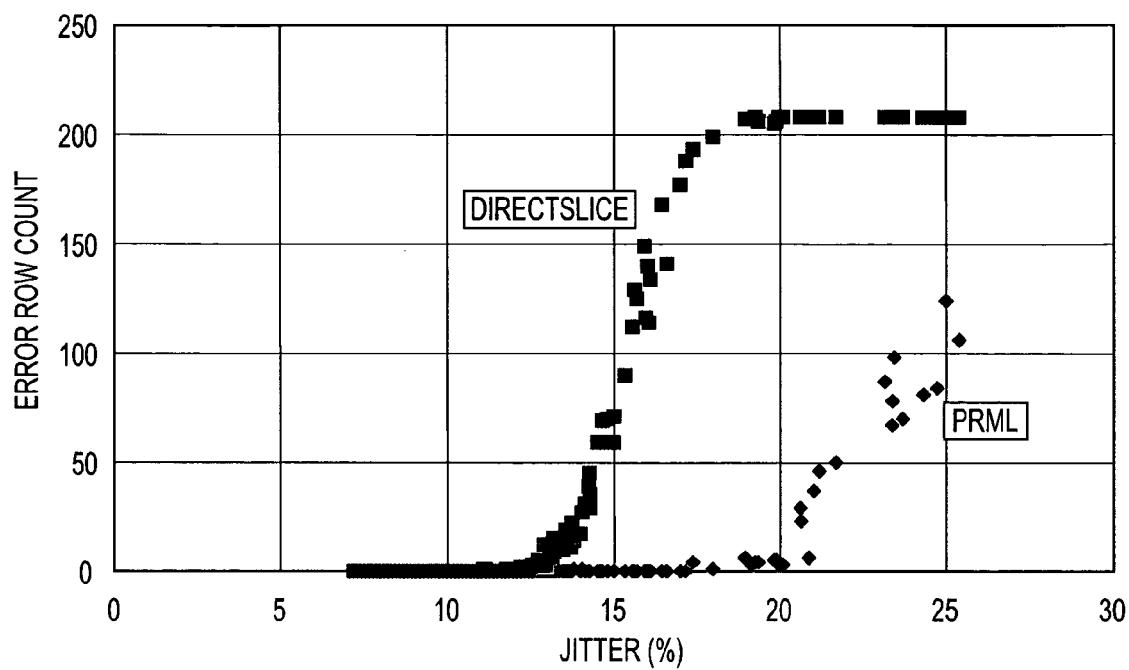
FIG. 13 is a graph showing the actual measurement results of the relationship between a jitter value and the number of row error.

FIG. 9 shows the actual measurement results of the relationship between tangential tilt and a jitter value. FIG. 10 shows the actual measurement results of the relationship between tangential tilt and PI error. The two binarization methods, the direct slice method and the PRML method, are compared with each other. It is understood that the PRML method shows higher performance. FIG. 11 shows the actual measurement results of the relationship between a read speed and a jitter value. It is understood that the jitter value increases as the read speed increases similarly to the simulation results. FIG. 12 shows the actual measurement results of the relationship between a jitter value and the number of PI error. It is understood that the difference in performance between the direct slice method and the PRML method is large similarly to the simulation results. FIG. 13 shows the actual measurement results of the relationship between a jitter value and the number of row error. With regard to the judgment standard of row error, the case wherein the number of byte error per PI frame is four or more is defined as row error. It is understood that the difference in performance between the direct slice method and the PRML method is large similarly to the above results. In particular, the difference is conspicuous when the jitter value is in the range from 15% to 20%.

Figure 14:
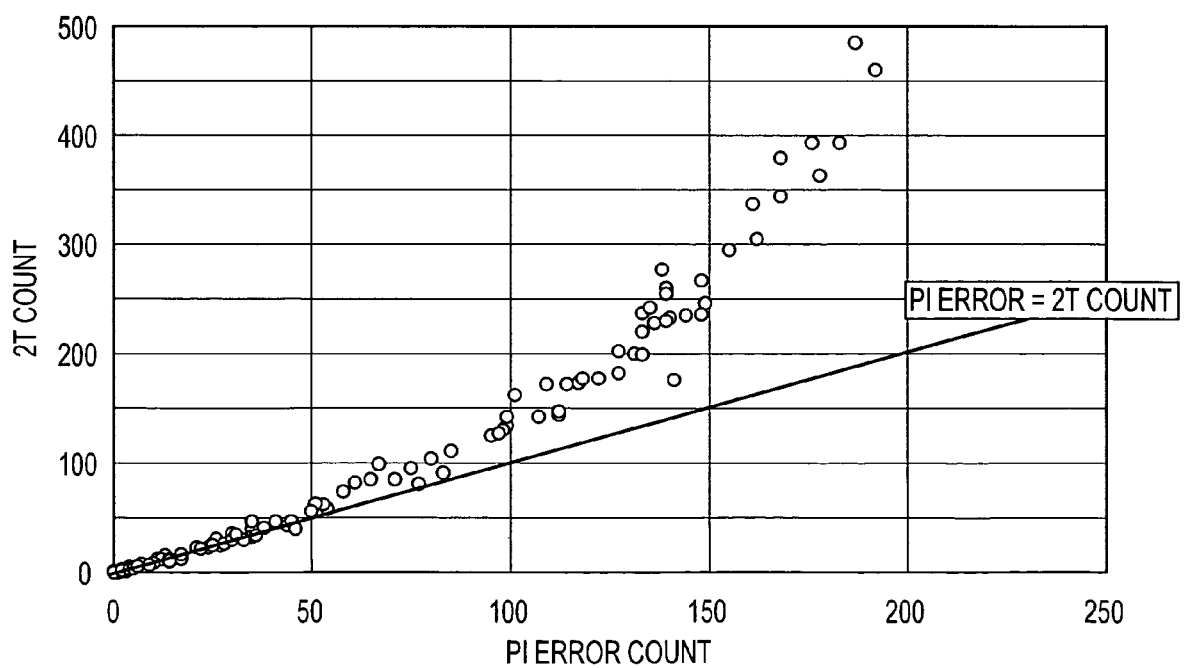
FIG. 14 is a graph showing the actual measurement results of the relationship between the number of PI error and the number of 2 T data included in the binarization result when the binarization is carried out by the direct slice method.

FIG. 14 shows the actual measurement results of the relationship between the number of PI error and the number of 2 T data included in the binarization result when the binarization is carried out by the direct slice method. It is confirmed that the number of PI error can be approximated by counting the number of 2 T data similarly to the simulation results.

Figure 15:
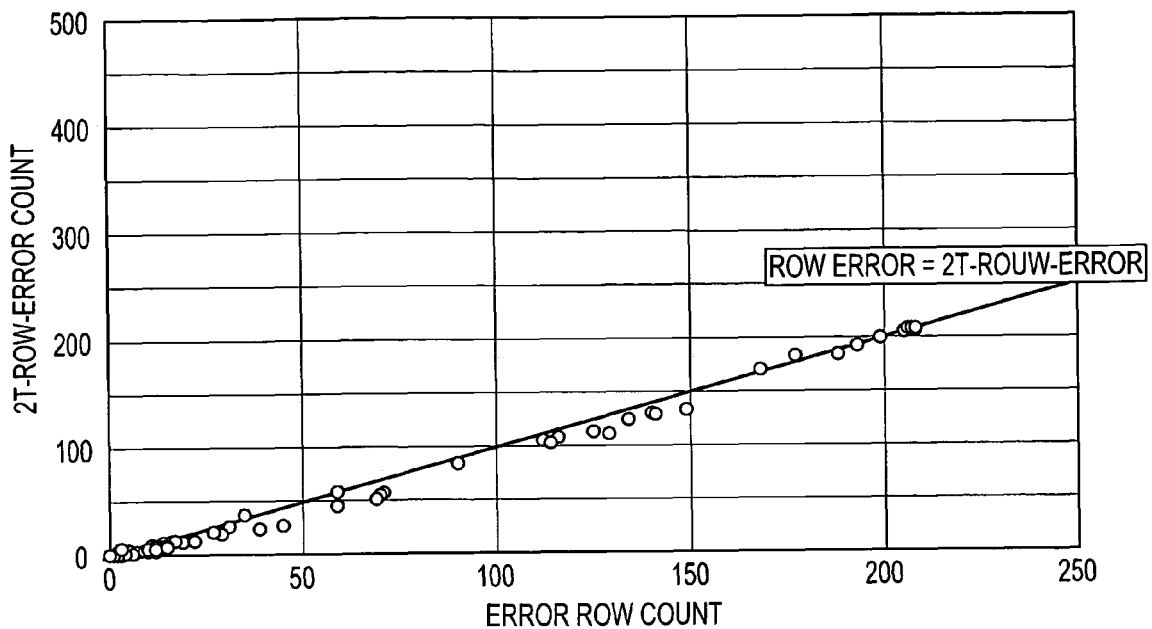
FIG. 15 is a graph showing the actual measurement results of the relationship between the number of row error and the number of 2 T-row-error included in the binarization result when the binarization is carried out by the direct slice method.

FIG. 15 shows the actual measurement results of the relationship between the number of row error and the number of 2 T-row-error included in the binarization result when the binarization is carried out by the direct slice method. The number of 2 T-row-error here is the total number of the zones wherein the number of 2 T data, which is counted in the same zone as a PI frame, included in the binarization result is four or more. It is understood that the number of row error can be approximated with a very high degree of accuracy by counting the number of 2 T-row-error. The reason why this approximation shows a higher accuracy in comparison with the case of PI error is presumably that the row error is defined by the case wherein a plurality of byte errors occur in a PI frame. From the experimental result, it is proved that the 2 T detection method of the present invention is excellent as the standard for verification.

Figure 16:
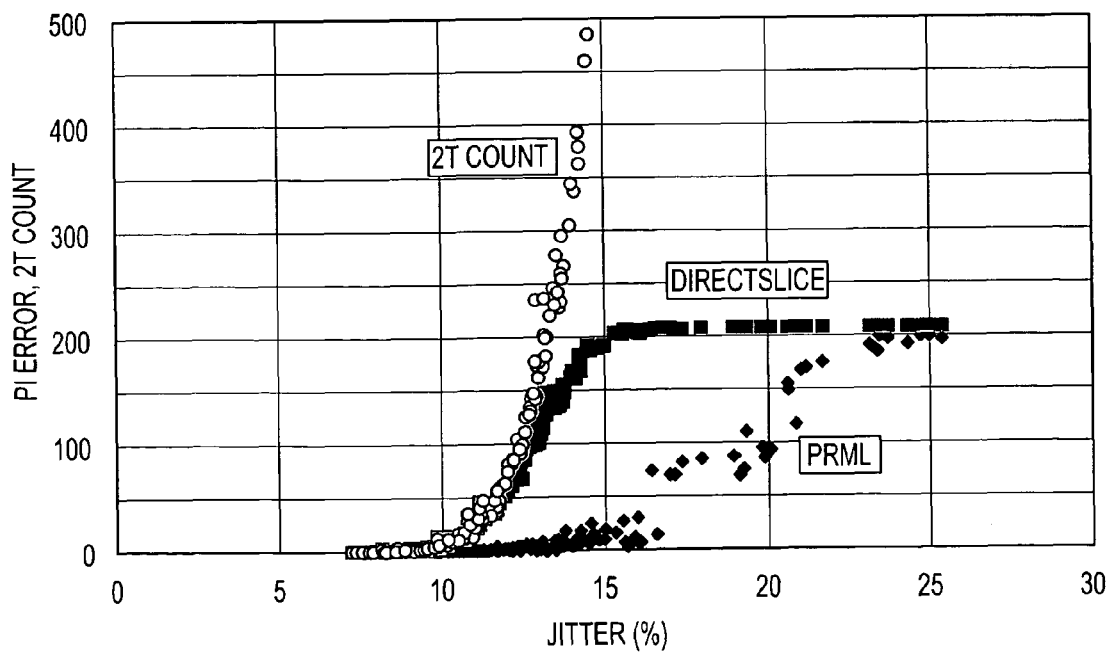
FIG. 16 is a graph showing the actual measurement results when the number of 2 T data is added to the results shown in FIG. 12.

FIG. 16 shows the actual measurement results when the number of 2 T data is added to the results shown in FIG. 12. The figure shows that a 2 T count can be approximated to the number of PI error by the direct slice method. Further, it has experimentally been verified that, although the upper limit of the number of PI error is 208 by the definition, the number of 2 T data does not have such an upper limit, hence saturation does not occur substantially in the increase of a jitter value, and the degree of freedom increases in setting a standard value for verification in accordance with a reproduction speed.

Figure 17:
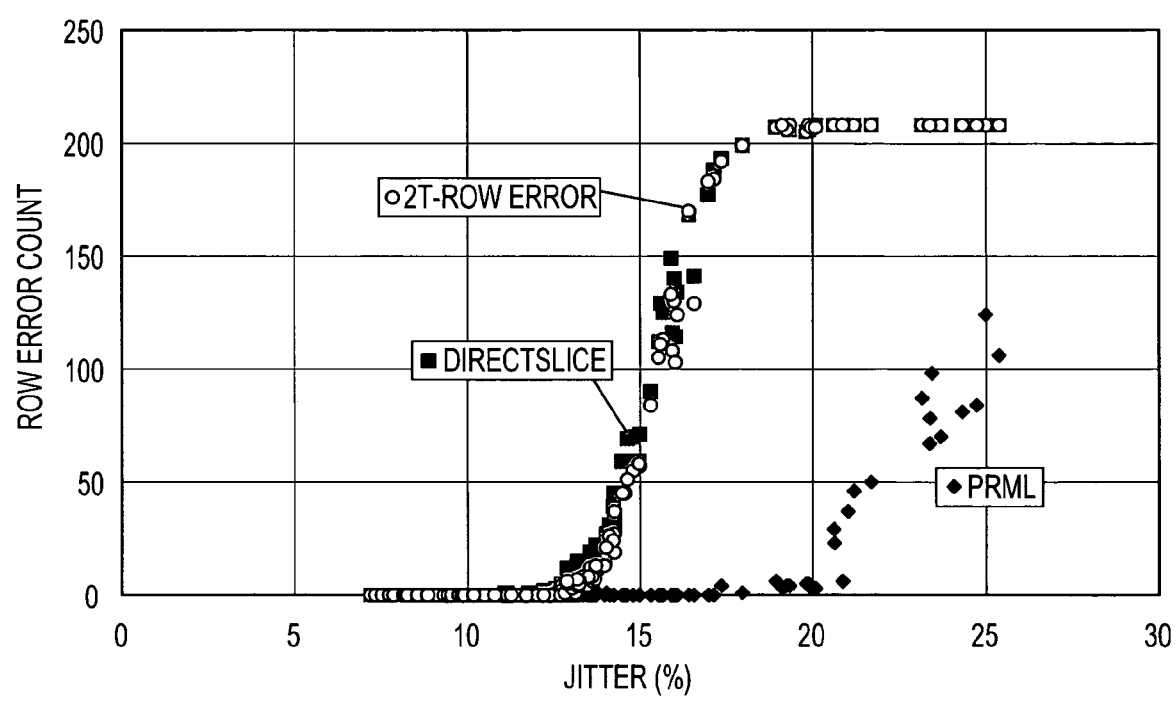
FIG. 17 is a graph showing the actual measurement results when the number of 2 T-row-error is added to the results shown in FIG. 13.

FIG. 17 shows the actual measurement results when the number of 2 T-row-error is added to the results shown in FIG. 13. The figure shows that it is possible to equivalently count the number of row error of the direct slice method with a very high degree of accuracy by the number of 2 T-row-error. Since the number of 2 T-row-error is defined as the count in the zone corresponding to a PI frame, the upper limit of the value is, similarly to the number of PI error, 208. However, as stated above, the threshold value in a PI frame is limited to four and hence the standard value for verification can be set in excess of ten which is the detection limit of an error correction code. In this light, the degree of freedom in setting a standard value for verification increases likewise similarly to the case shown in FIG. 16.

Figure 18:
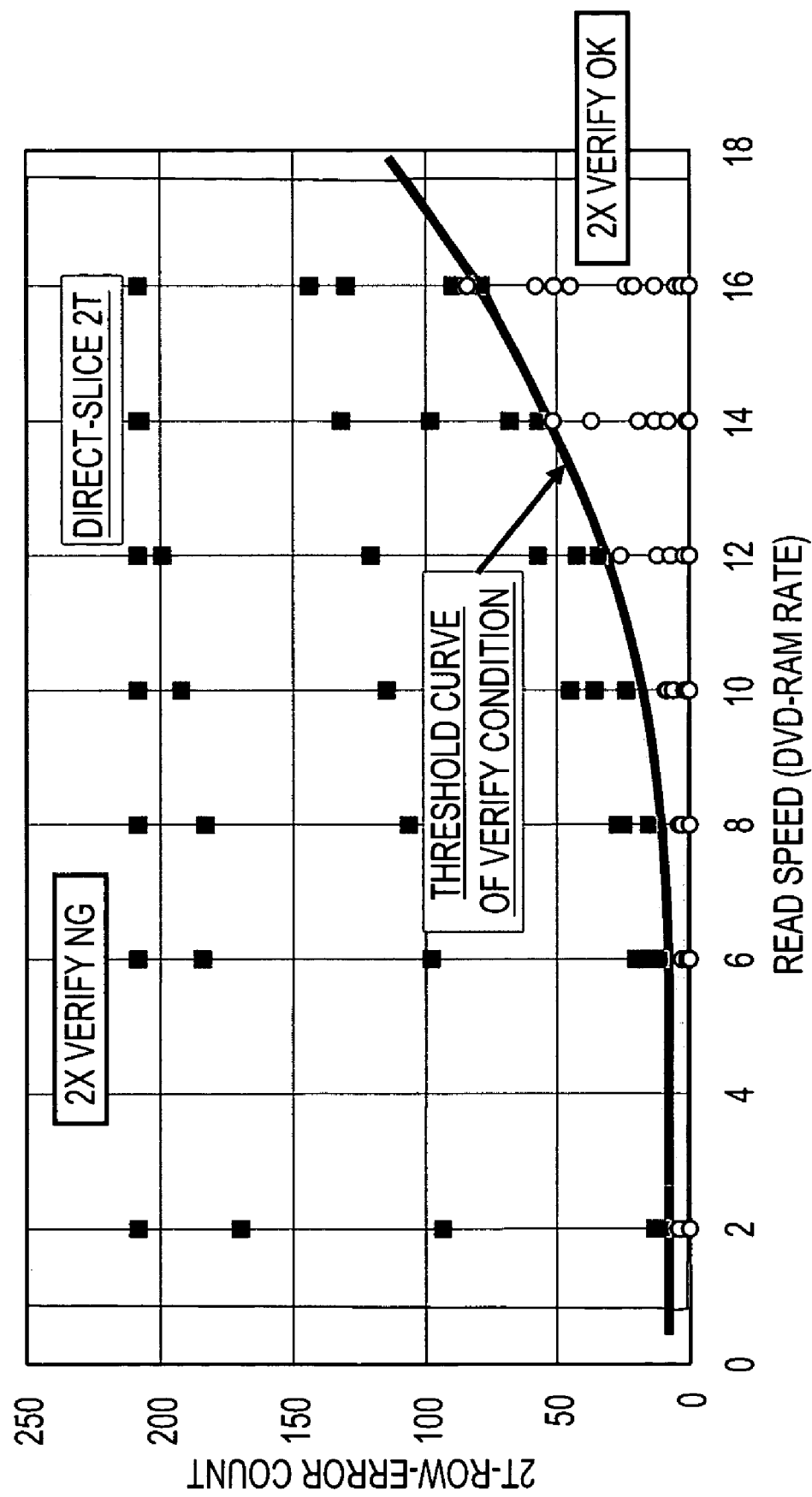
FIG. 18 is a graph showing the actual measurement results of the relationship between a read speed and the number of 2 T-row-error.

FIG. 18 shows the actual measurement results of the relationship between a read speed and the number of 2 T-row-error. The number of 2 T-row-error also increases in proportion to the increase of the read speed in the same way as the increase of the jitter value. The threshold curve of verification condition in the figure represents the boundary condition to decide whether or not the verification judgment by the direct slice method at a double speed which is the standard read speed of a 4.7 GB DVD-RAM is good, and the figure shows that the boundary condition varies in accordance with the read speed. Hence, the threshold value in the number of 2 T-row-error at the double speed is eight which is the recommended value. From the figure, it is understood that the results of verification judgment at the double speed can be zoned regardless of the read speed. That is, by setting a threshold value of the judgment of the number of 2 T-row-error conforming to the read speed along the threshold curve of the verification condition in the figure, it becomes possible to realize the judgment of the recorded data quality equivalent to the verification by the direct slice method at the double speed which is the standard speed and thus to assure the reproduction compatibility.

Figure 19:
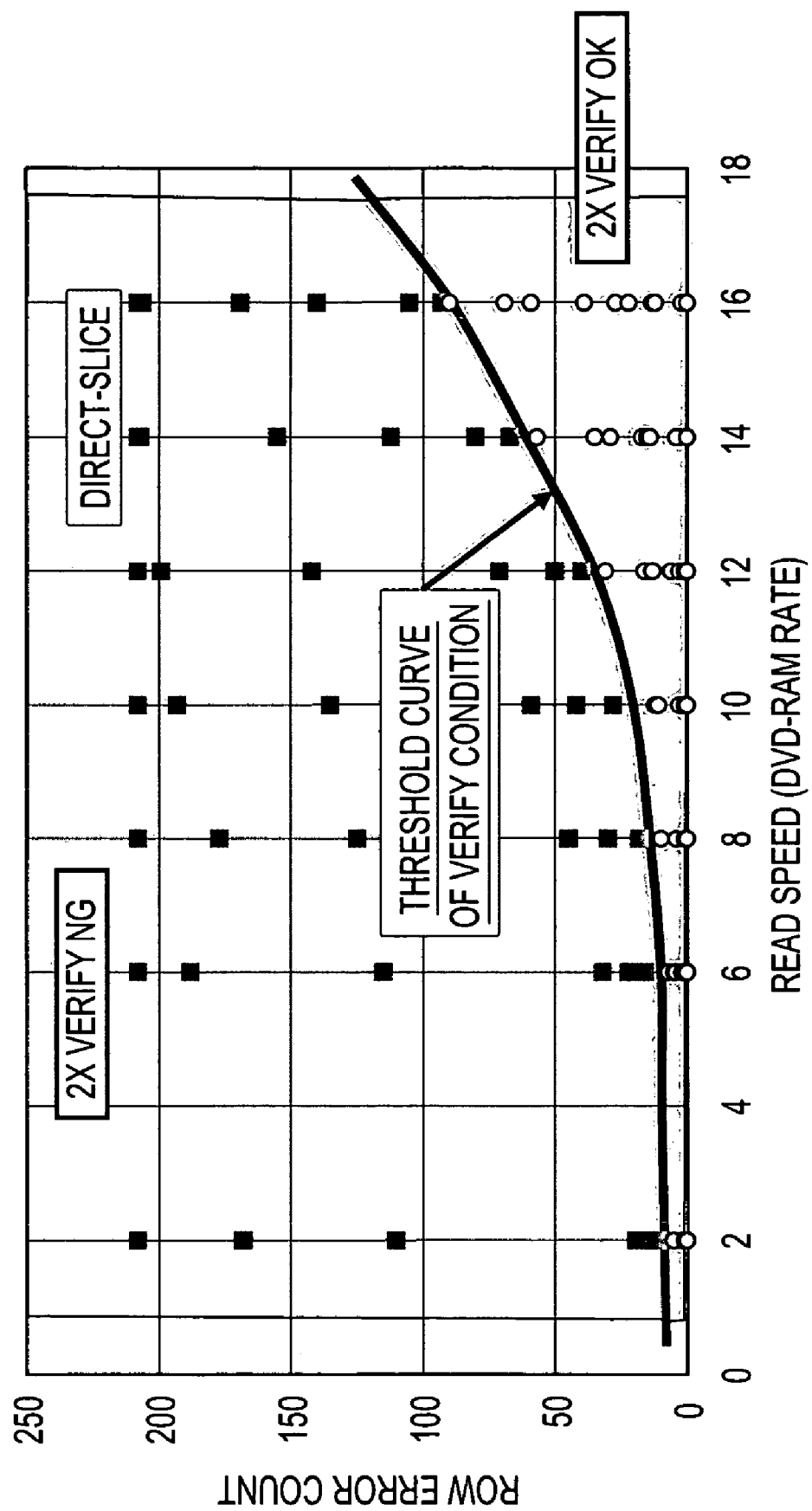
FIG. 19 is a graph showing the actual measurement results of the relationship between a read speed and the number of row error by the direct slice method.

FIG. 19 shows the actual measurement results of the relationship between a read speed and the number of row error by the direct slice method. Similarly to the case of FIG. 18, it is possible to count the number of row error through error correction processing from the results binarized by the direct slice method, change the judgment threshold value along the threshold curve of verification condition, and thereby assure the reproduction compatibility.

Figure 20:
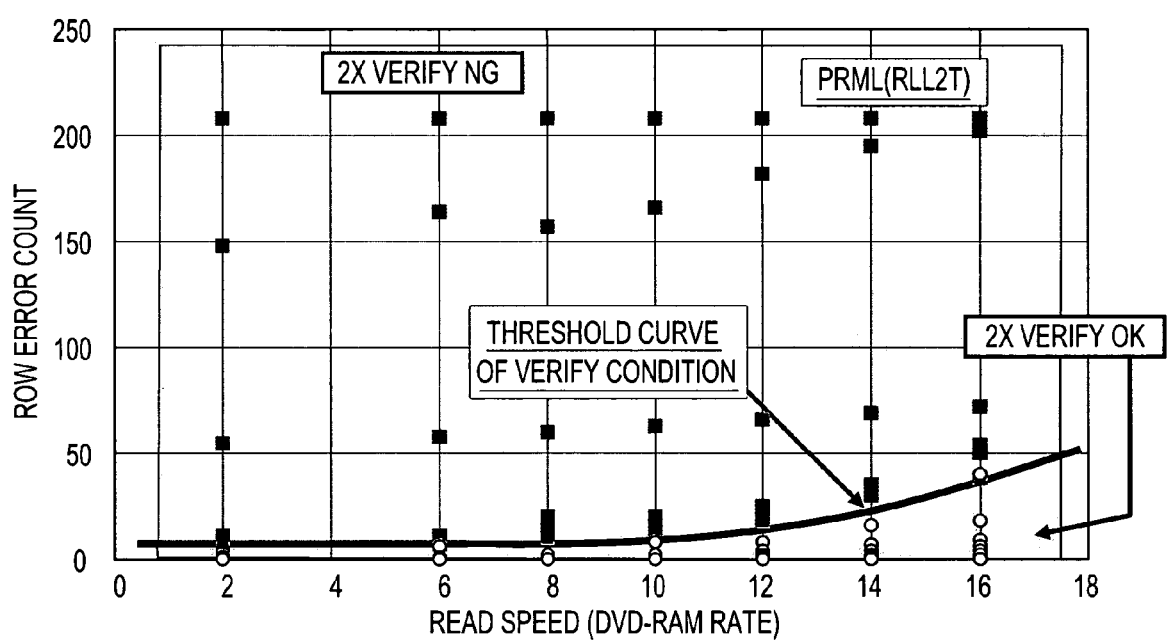
FIG. 20 is a graph showing the actual measurement results of the relationship between a read speed and the number of row error by the PRML method wherein a 2 T run length is validated.

FIG. 20 shows the actual measurement results of the relationship between a read speed and the number of row error by the PRML method wherein a 2 T run length is validated. In the same way as above, it is possible to change the judgment threshold value of the number of row error along the threshold curve of verification condition and thereby assure the reproduction compatibility.

Figure 21:
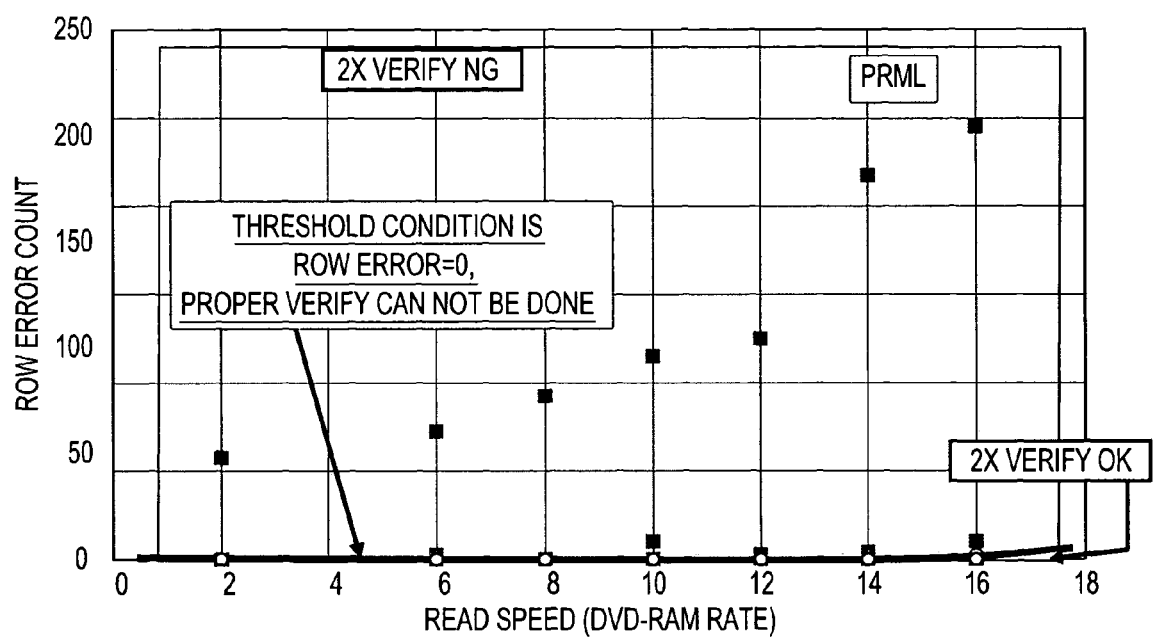
FIG. 21 is a graph showing the actual measurement results of the relationship between a read speed and the number of row error by the ordinary PRML method.

FIG. 21 shows the actual measurement results of the relationship between a read speed and the number of row error by the ordinary PRML method. In this case, it is impossible to obviously define a threshold value by the difference in characteristics between the direct slice method and the PRML method. The reason is that the reproduction compatibility cannot be assured unless even the case wherein the number of row error is zero is judged to be verification error.

Figure 22:
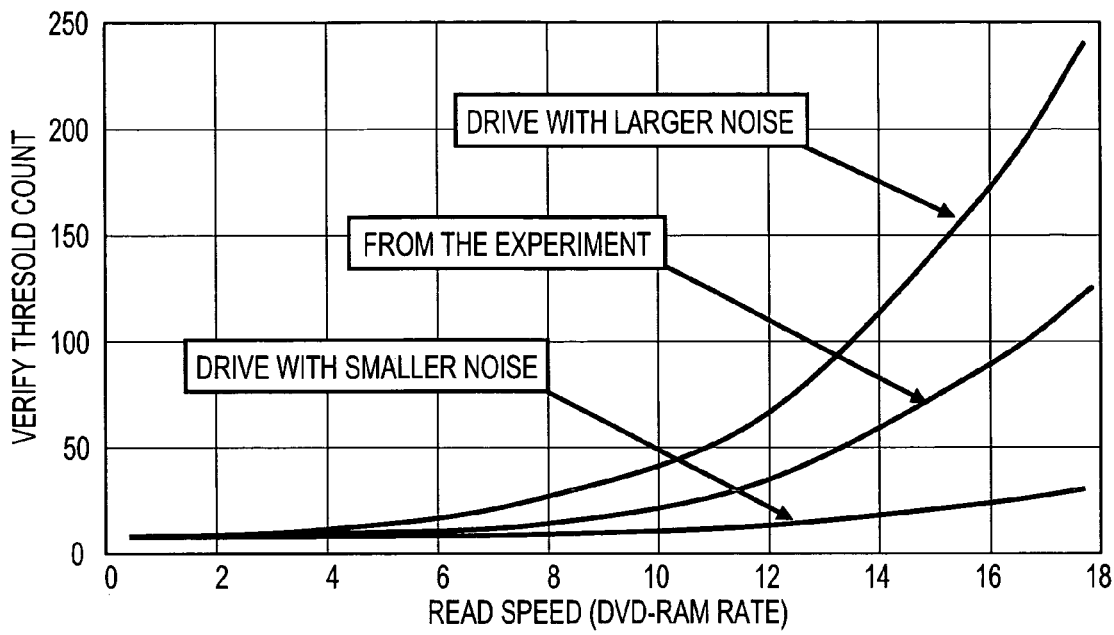
FIG. 22 is a graph schematically showing the method of setting the threshold curve of the verification condition for each optical disk drive model.

The above experimental results are those that depend on the size of the amplifier noise of the used evaluator. Actual drives vary in the size of amplifier noise. In this case, it is necessary to set the threshold curve of verification condition in accordance with the model of an optical disk drive. FIG. 22 is a graph schematically showing the situation. Such setting may be achieved by carrying out the same experiments as shown above and deciding an appropriate threshold value of verification condition in accordance with the magnitude of the influence of amplifier noise.

Figure 23:
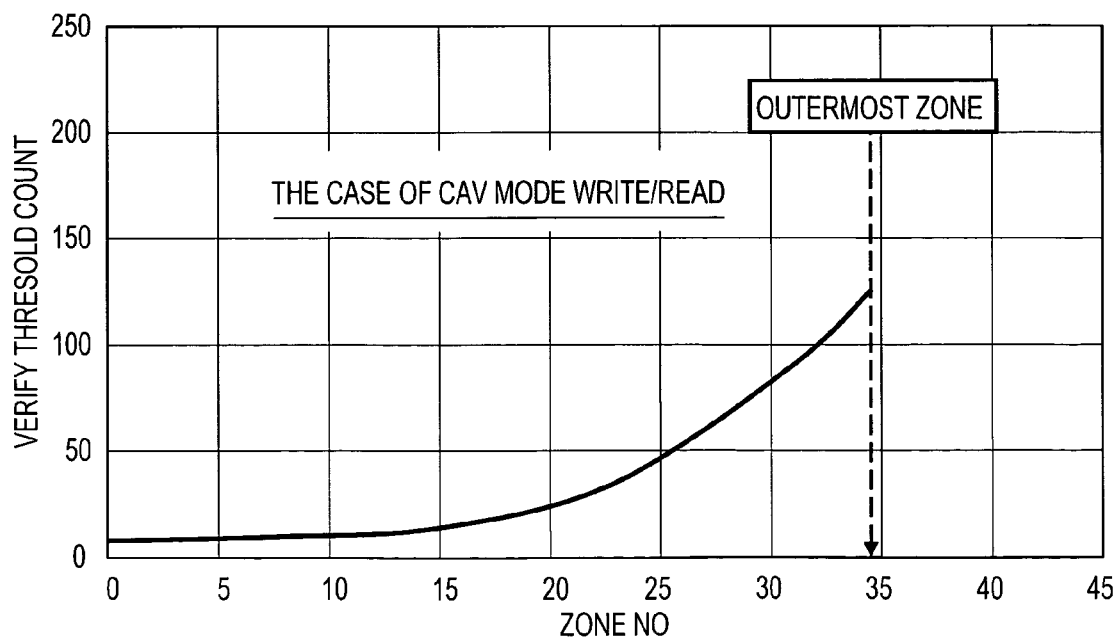
FIG. 23 is a graph schematically showing the threshold curve of the verification condition of a disk, such as a DVD-RAM, divided into plural zones.

FIG. 23 is a graph schematically showing the threshold curve of verification condition in a disk divided into plural zones such as a DVD-RAM. As stated above, when record/reproduction is carried out by the CAV mode or a rotation control means conforming to the CAV mode, it is convenient to set beforehand the threshold curve of verification condition in accordance with the zone number from the viewpoint of constructing control software of a drive. The figure shows an example in the case of the CAV mode.

Figure 24:
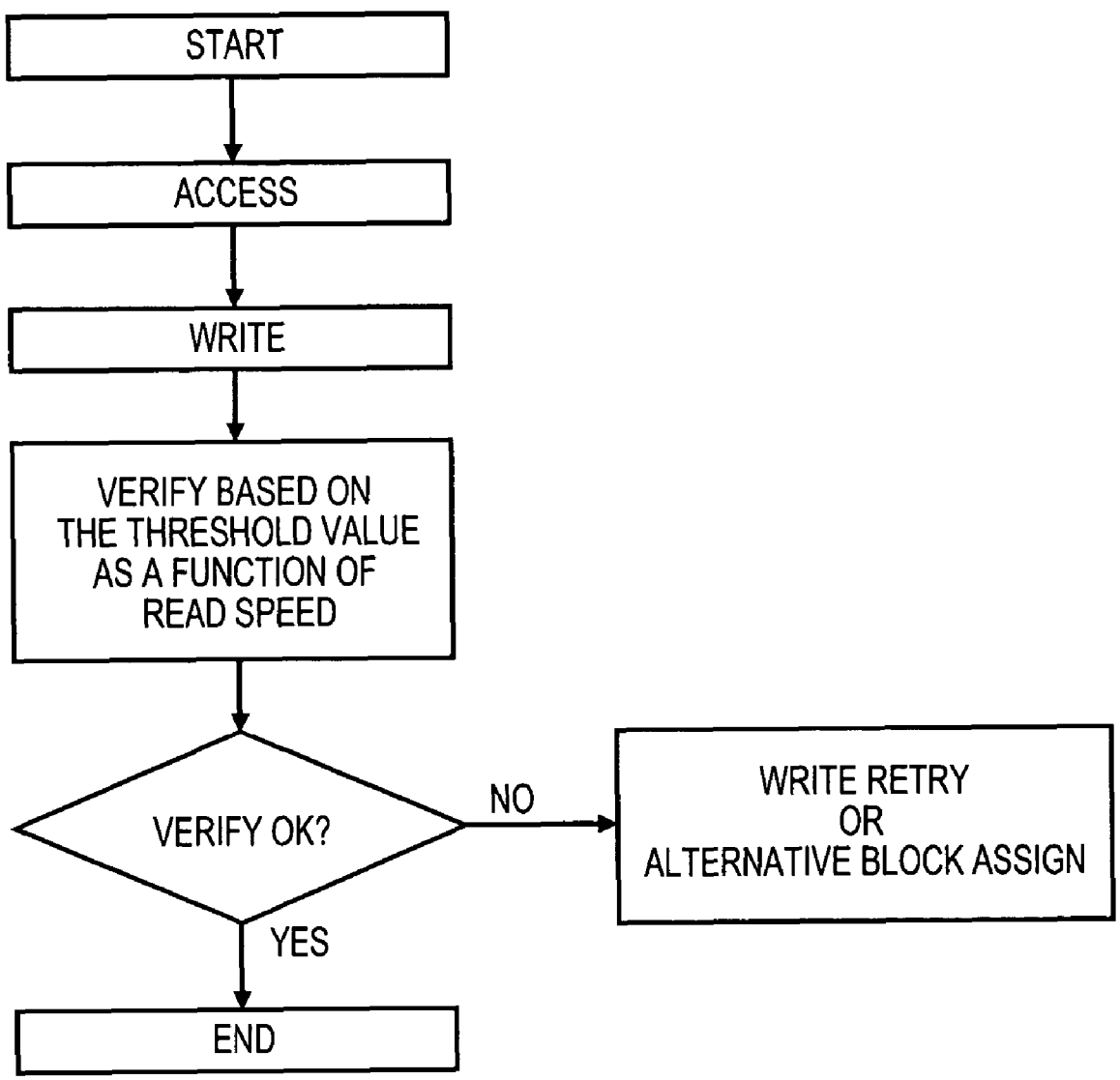
FIG. 24 is a flowchart showing the reproduction method of carrying out verification according to the present invention.

FIG. 24 is a flow chart showing the reproduction method of carrying out verification according to the present invention. After data is recorded, verification is carried out under an appropriate threshold condition conforming to the reproduction speed, and the processing is terminated when the judgment result is OK or record retrying or alternation block processing is applied when the judgment result is NG.

Second Embodiment (Circuit)

The configuration of a circuit suitable for the realization of an optical disk drive according to the present invention is hereunder explained on the basis of the drawings.

Figure 1:
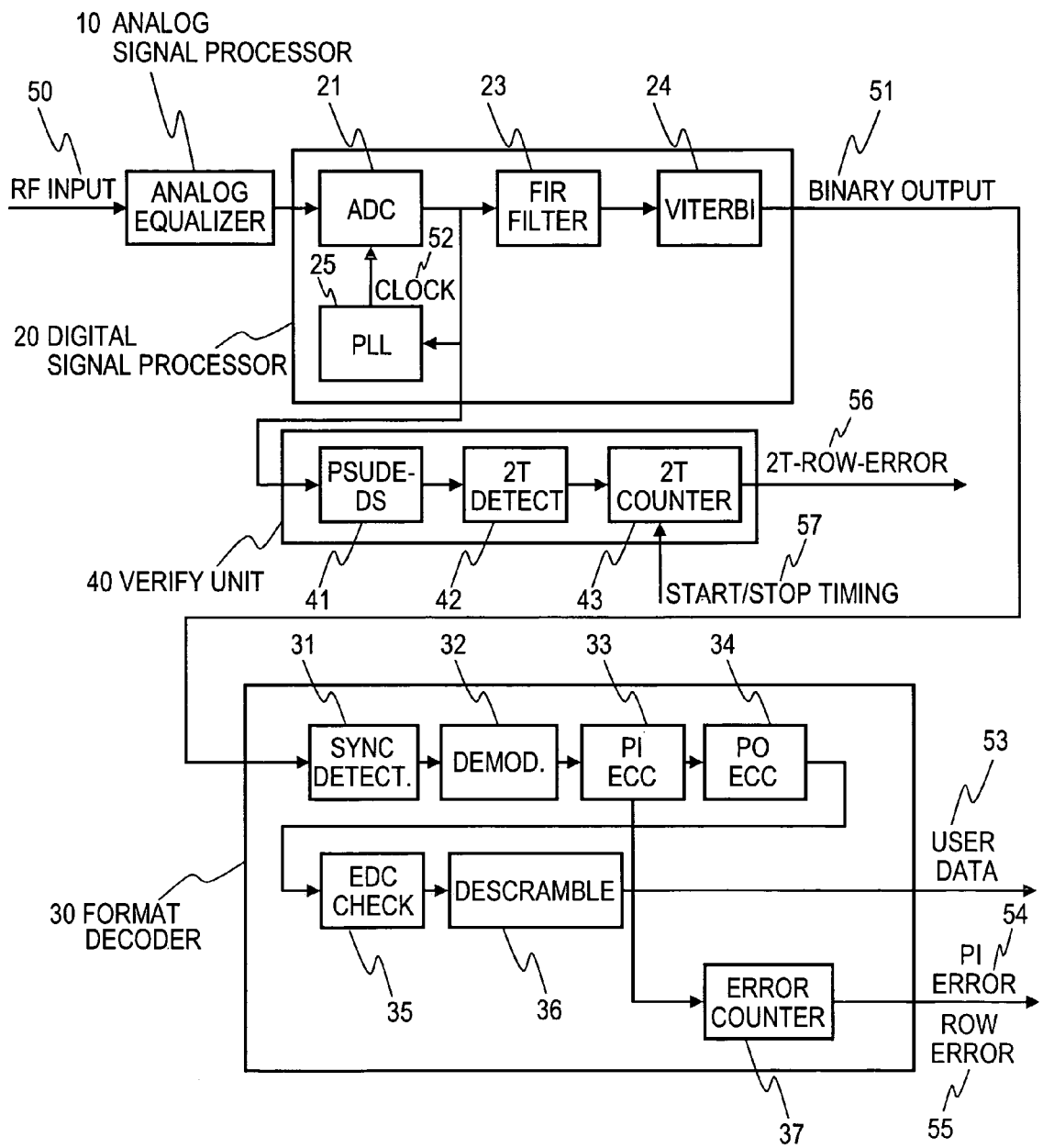
FIG. 1 is a block diagram showing a circuit configuration suitable for the implementation of the present invention.
Figure 2:
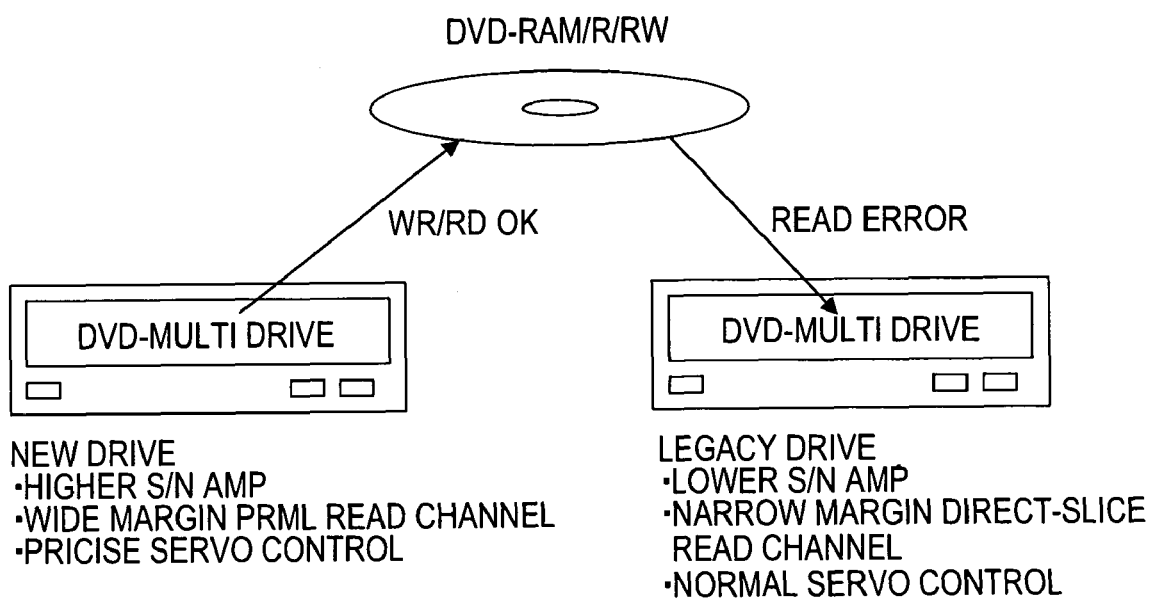
FIG. 2 is a view schematically showing the problem to be solved by the present invention.
Figure 3:
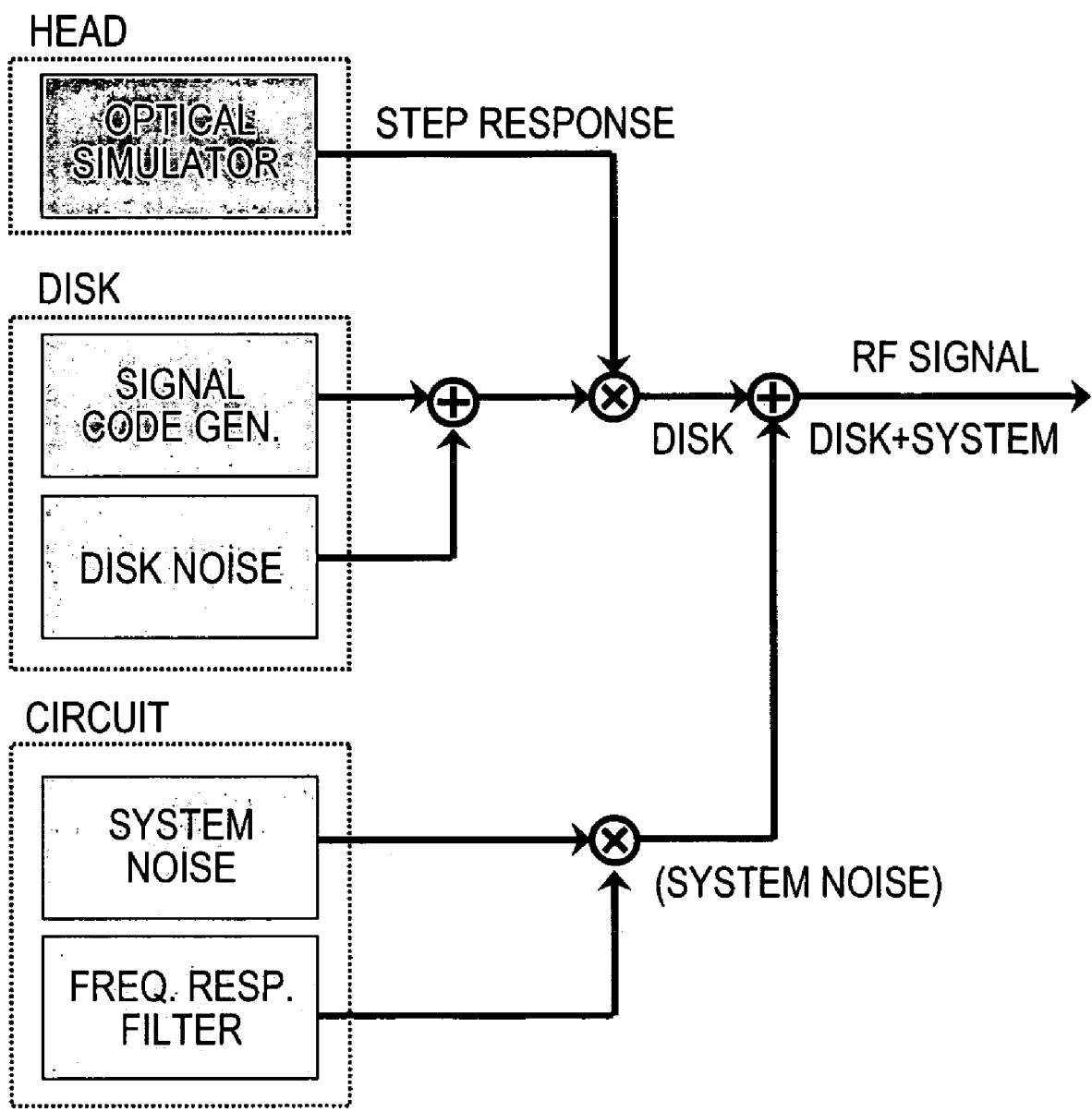
FIG. 3 is a chart showing a simulation model of a regenerative signal of an optical disk used in the study.
Figure 4:
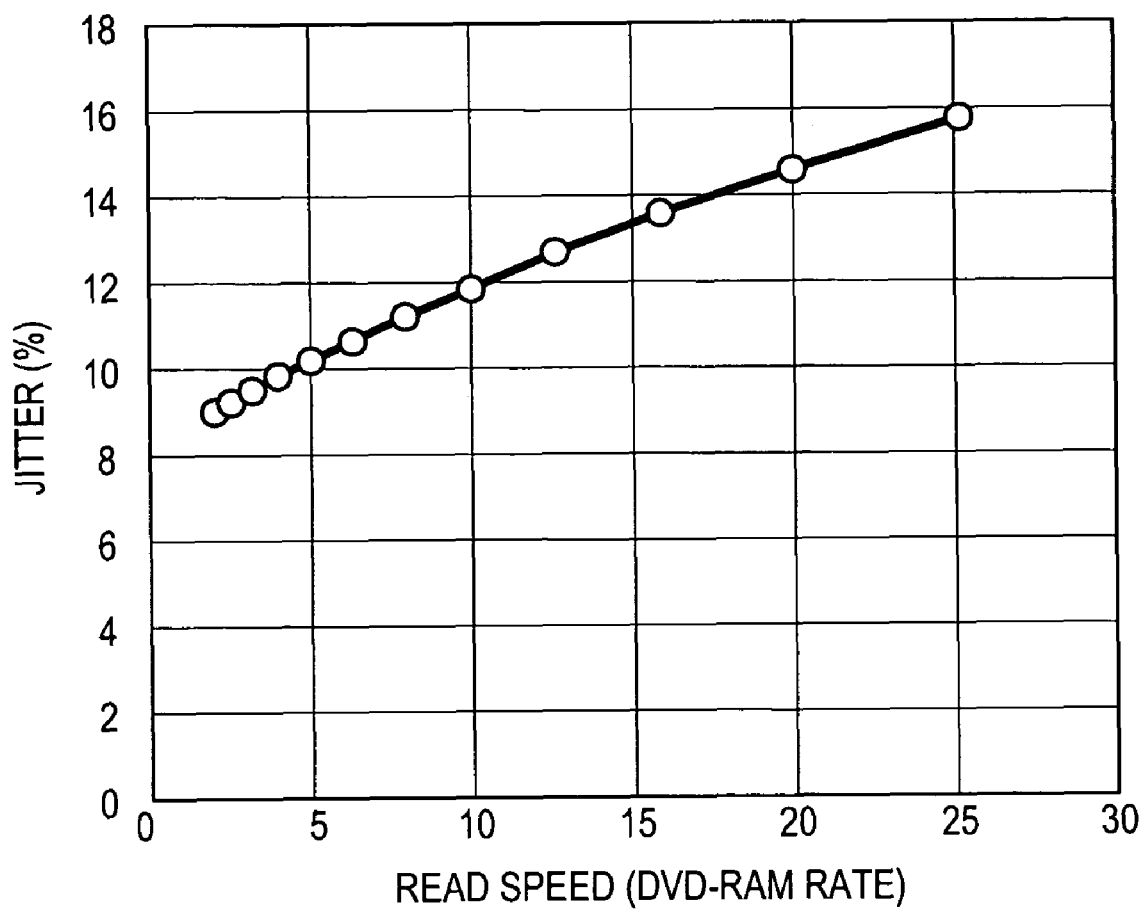
FIG. 4 is a graph showing a simulation result on the relationship between the read speed and jitter of a DVD-RAM medium.
Figure 5:
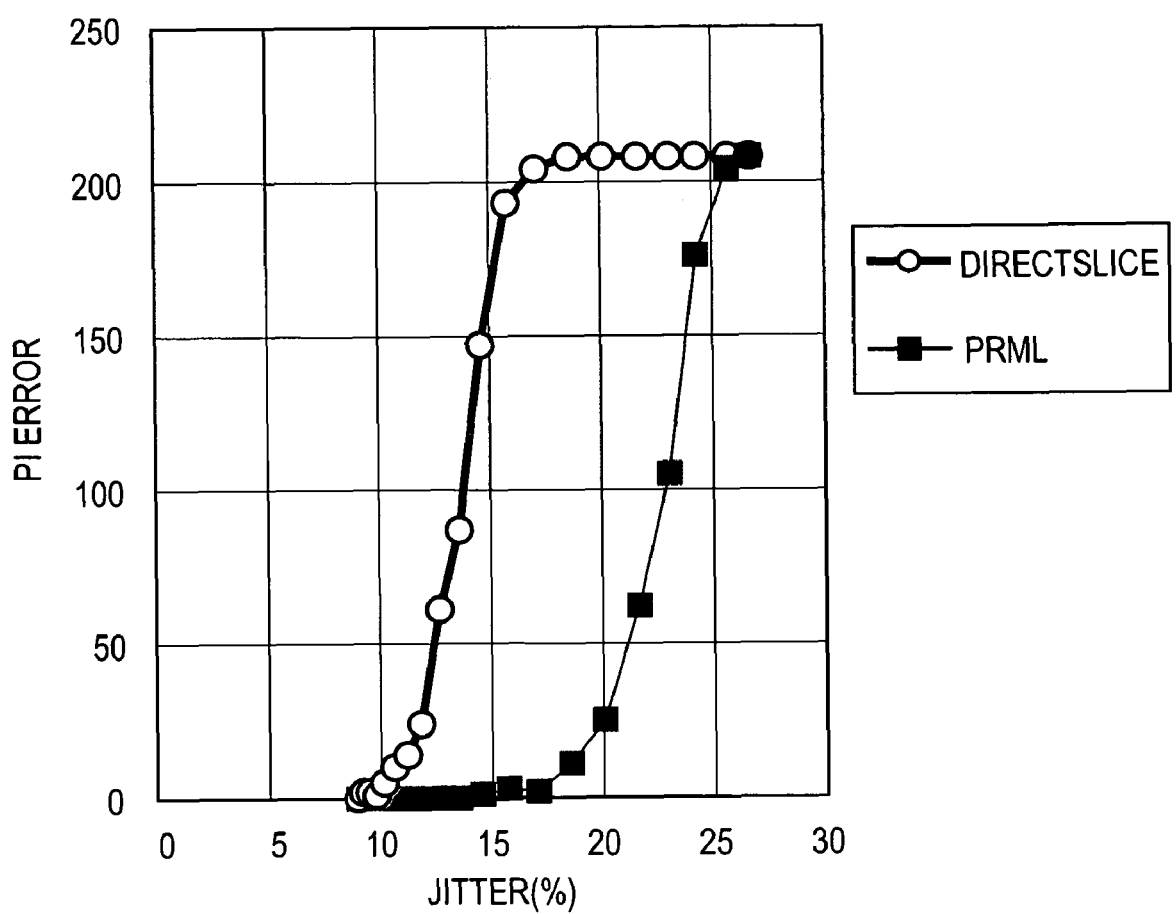
FIG. 5 is a graph showing the relationship between jitter and PI error.
Figure 6:
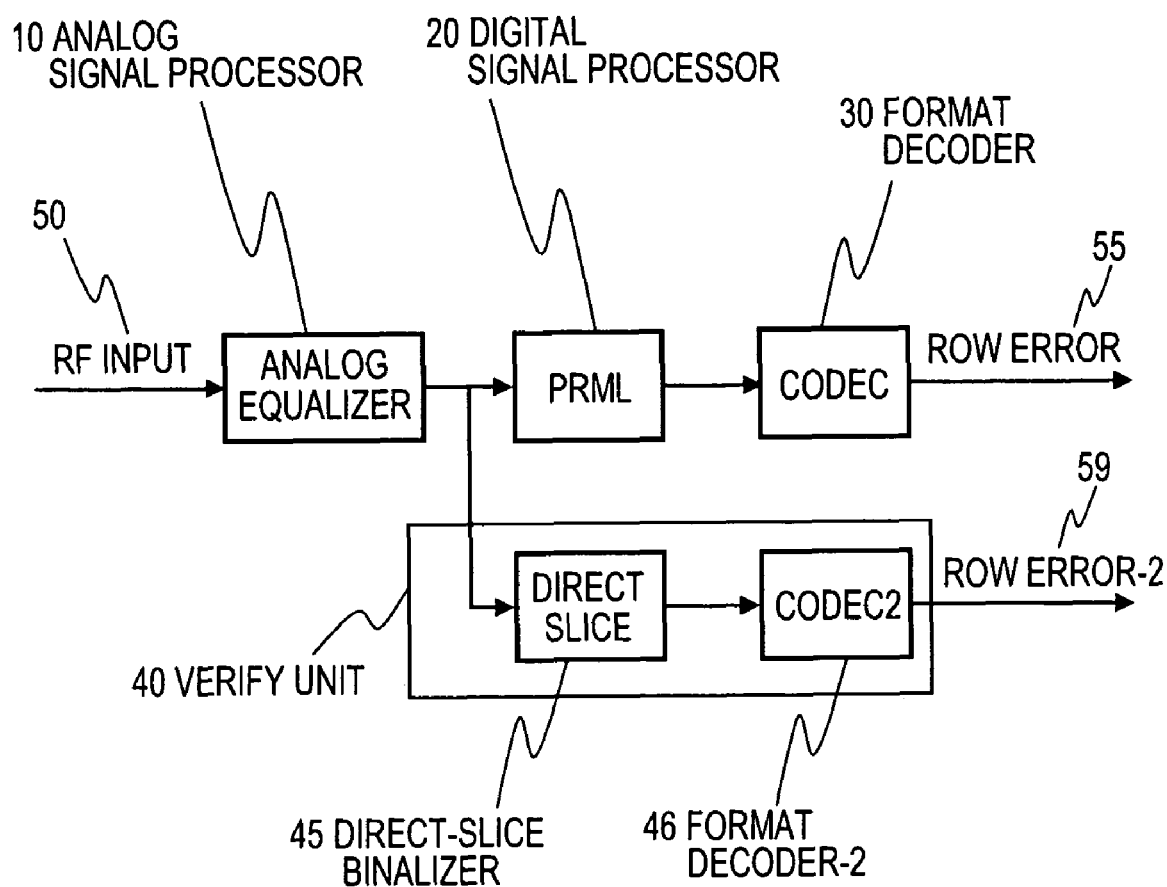
FIG. 6 is a block diagram showing a reproduction system to carry out verification on the analogy of a conventional technology.
Figure 7:
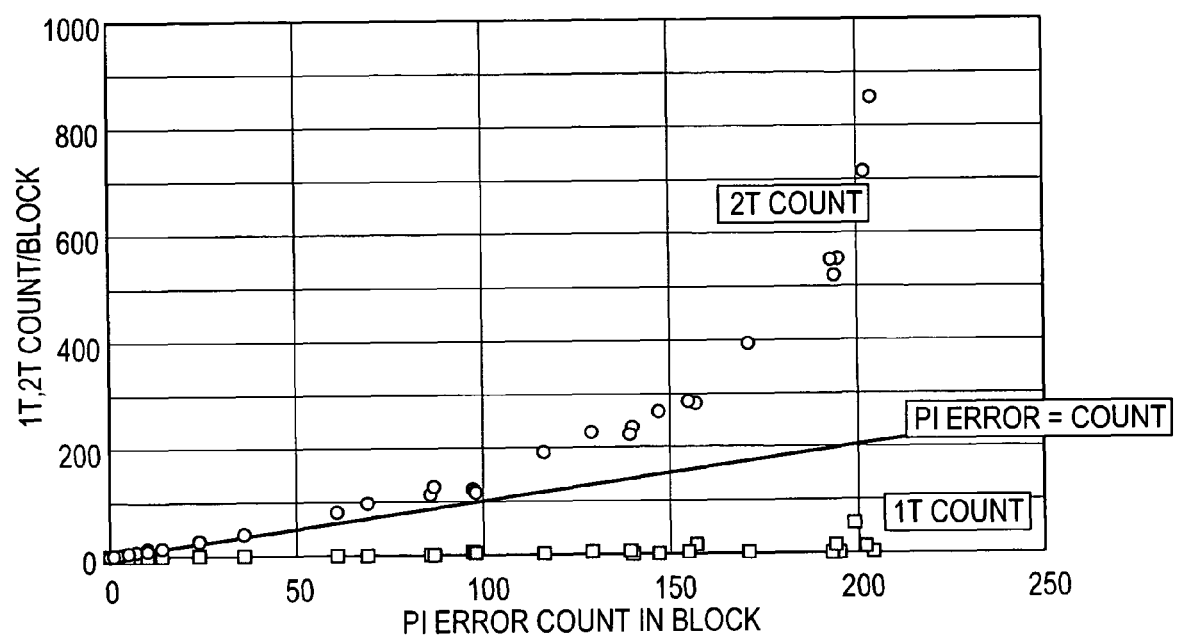
FIG. 7 is a graph showing the relationship between the number of PI error and the number of the incidence of 1 T and 2 T data in a block.
Figure 8:
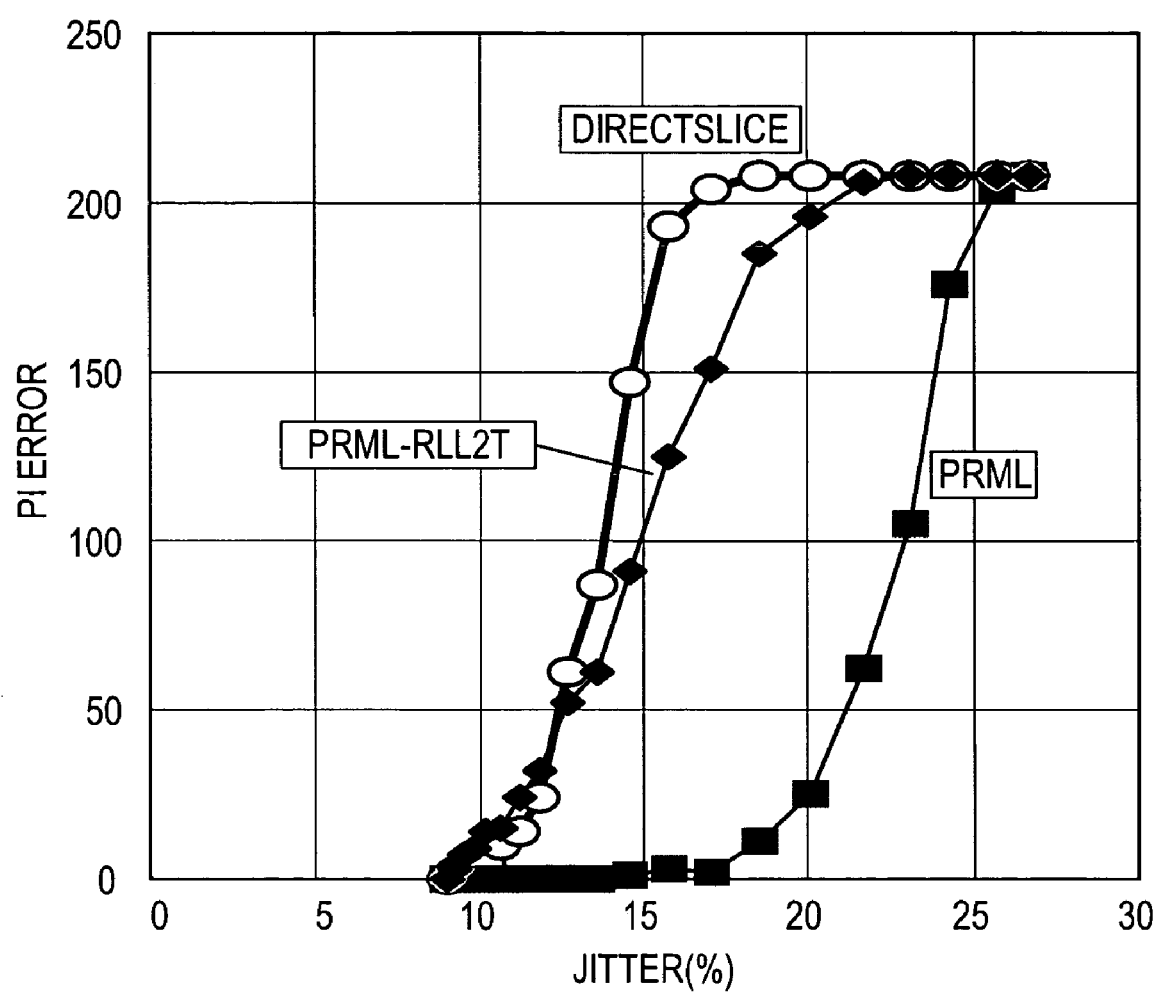
FIG. 8 is a graph showing the relationship between jitter and PI error.

FIG. 1 is a block diagram showing a circuit configuration suitable for the implementation of the present invention. An RF signal 50 detected with an optical head not shown in the figure is subjected to equalization processing, AGC processing and others with an analog signal processor 10 and thereafter input into a digital signal processor 20. In the digital signal processor 20, the input RF signal is: converted into a digital signal for each clock with an AD converter 21; thereafter digitally equalized with an FIR filter 23; binarized with a Viterbi decoder 24; and ejected as a binarized signal 51. The internal structure of the Viterbi decoder 24 is not described here in detail because it exceeds the scope of the present invention but, just briefly, the Viterbi decoder 24 is a device to compare a regenerative signal with a target signal produced through the convolution of a bit string and a PR class and to select and binarize the bit string having the least error. It is also acceptable to optimize a tap coefficient by the LMS (Least Mean Square) method or the like with a tap coefficient learning machine not shown in the figure. A PLL (Phase Locked Loop) circuit 25 that produces a clock signal 52: incorporates a phase comparator, a lowpass filter, a DAC (Digital to Analog Converter), and a VCO (Voltage Controlled Oscillator), those being not shown in the figure; controls voltage applied to the VCO; and makes the clock signal 52 track the regenerative signal.

A format decoder 30 comprises: a sync pattern detector 31; a demodulator 32; a PI error corrector 33; a PO error corrector 34; an EDC checker 35; a descrambler 36; and an error counter 37. The sync pattern detector 31 accepts the binarized signal 51 as the input and detects the position of a specific sync pattern in accordance with a disk format. The demodulator 32 carries out demodulation processing in conformity with the code of the disk format and records the demodulated byte data on a DRAM not shown in the figure in accordance with the position information detected with the sync pattern detector 31. The data is subjected to error correction with the PI error corrector 33 and the PO error corrector 34, respectively, in accordance with the relevant Reed-Solomon code, and whether or not the results are normal is checked with the EDC checker 35. The descrambler 36 demodulates the scrambled state in accordance with the disk format and transmits the user data 53 to a host computer through an interface circuit not shown in the figure. The error counter 37 monitors and counts the number of error incidence for each frame in the PI error collector. The results are extracted as the PI error number 54 and the row error number 55.

Meanwhile, a verify unit 40 which is a feature of the present invention comprises: a pseudo-direct slice binarizer 41; a 2 T detector 42; and a 2 T counter 43. The pseudo-direct slice binarizer 41 is, as described in JP-A No. 298514/2002, a device which carries out simple pseudo-binarization by a digital signal converted with the AD converter 21 without a direct slice binarizer being provided as another circuit. The details are described later but, in a simplest case, it is possible to realize the binarization equivalent to the direct slice method by extracting only the code bit of a digital signal. The number of 2 T included in the binarization result is counted with the 2 T detector 42 and the 2 T counter 43. In this case, the timing control such as the count at each PI error frame as stated above is realized through the start/stop timing control signal 57 from the format decoder 30 and the like. The result is extracted as the 2 T-row-error number 56.

By using such a configuration, it is possible to realize the reproduction compatibility in the PRML method and the direct slice method with a threshold value conforming to a read speed as shown in FIG. 22.

FIG. 25 comprises schematic views showing the concept of a pseudo-direct slice binarizer. There are two cases with regard to the timing of AD conversion; one is the case where the timing of AD conversion deviates from the edge of a regenerative signal by a half clock and the other is the case where the timing of AD conversion synchronizes with the edge. The case 1 in the figure shows the case where the timing of AD conversion deviates from the edge of a regenerative signal by a half clock. When a DC correction circuit is mounted though it is not shown in FIG. 1, the binarization by the direct slice method is determined by the code of data y[i]. Therefore, when the interior of the circuit is a signed bit string, it is possible to obtain the result of binarization equivalent to the direct slice method by extracting only an MSB. In contrast, the case 2 shows the case where the timing of AD conversion synchronizes with the edge of a regenerative signal. In this case, it is necessary to compute the signal level y'[i] between two data from the digitalized regenerative signal string through interpolation processing. If y'[i] can be obtained, the result of binarization equivalent to the direct slice method can be obtained through the processing similar to the case 1. Here, as the interpolation processing, it is possible to use (1) average value at consecutive two points, (2) computation with an FIR filter, or (3) interpolating computation using a spline function. The item (1) is equivalent to the quasi-computation of moving average, therefore error increases when the amplitude of the minimum run length signal is small, and thus the item (1) is not recommendable. The item (3) is excellent in performance but the size of the circuit becomes huge. For those reasons, it is considered that the item (2) of the interpolation with an FIR filter is most suitable. In this case, care must be taken so that the number of taps of the used FIR filter is an even number. Further, when the tap number is two, the same problem as the item (1) cannot be solved. Therefore, the tap number should be four or more. It is also necessary to make the best efforts to choose the means that can make the frequency response flat and only the phase of the signal shift by a half clock. In the case where the tap number is four for example, the coefficient string (−0.125,+0.625,+0.625,−0.125) may be used.

Figure 26:
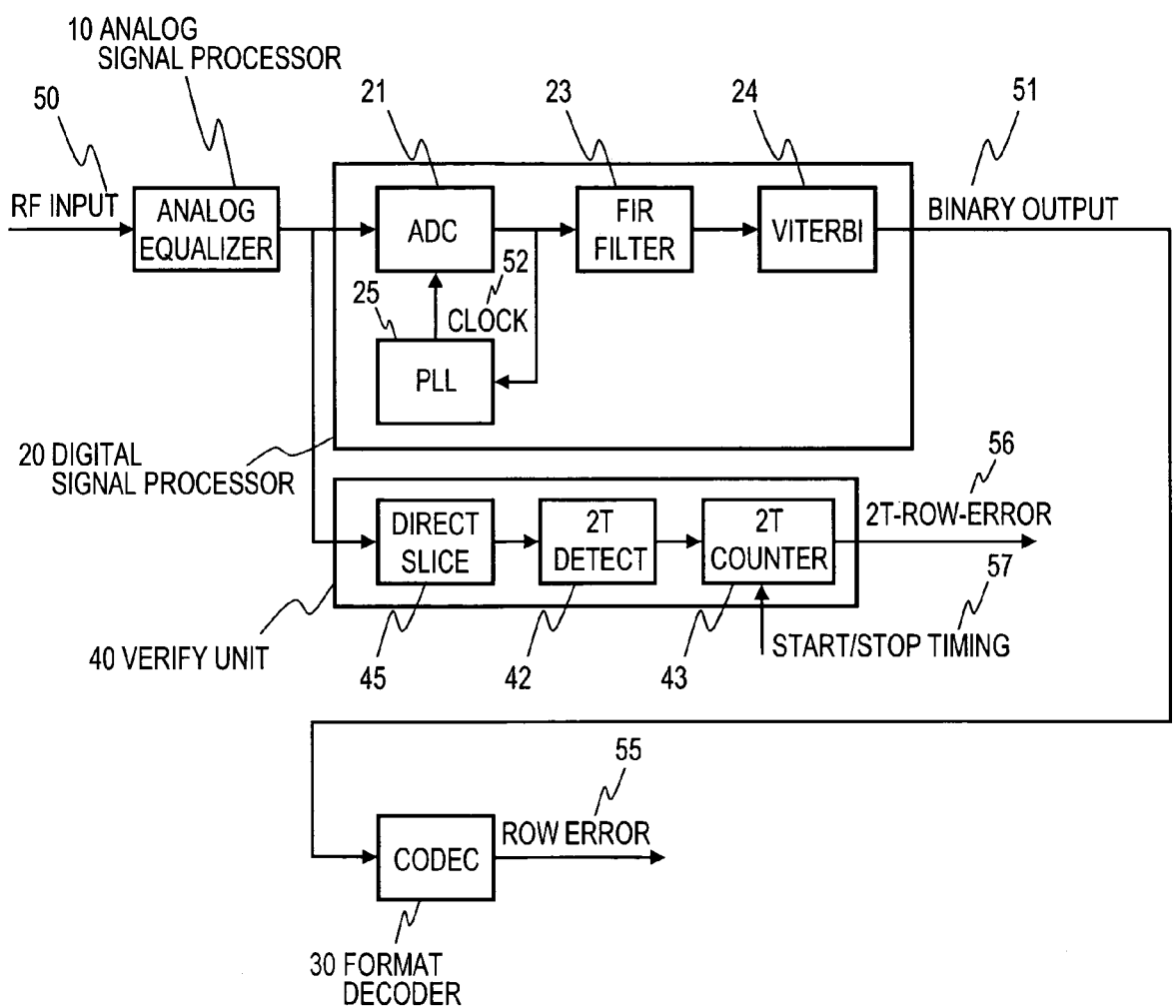
FIG. 26 is a block diagram showing another embodiment of a circuit configuration according to the present invention.

FIG. 26 is a block diagram showing another embodiment of a circuit configuration according to the present invention. In the figure, others than the verify unit 40 are the same as those in FIG. 1. Then, the reason why the format decoder 30 is illustrated in a simplified manner is to facilitate the comprehension of the present invention. The feature of the present embodiment is that a direct slice binarizer 45 is additionally installed as described in JP-A No. 298514/2002. Hence, the output signal of an analog signal processor 10 is used as the input and ordinary binarization is carried out. The clock necessary at the time is supplied from a PLL circuit 25 though it is not shown in the figure. The operation is the same as that explained in relation to FIG. 1.

Figure 27:
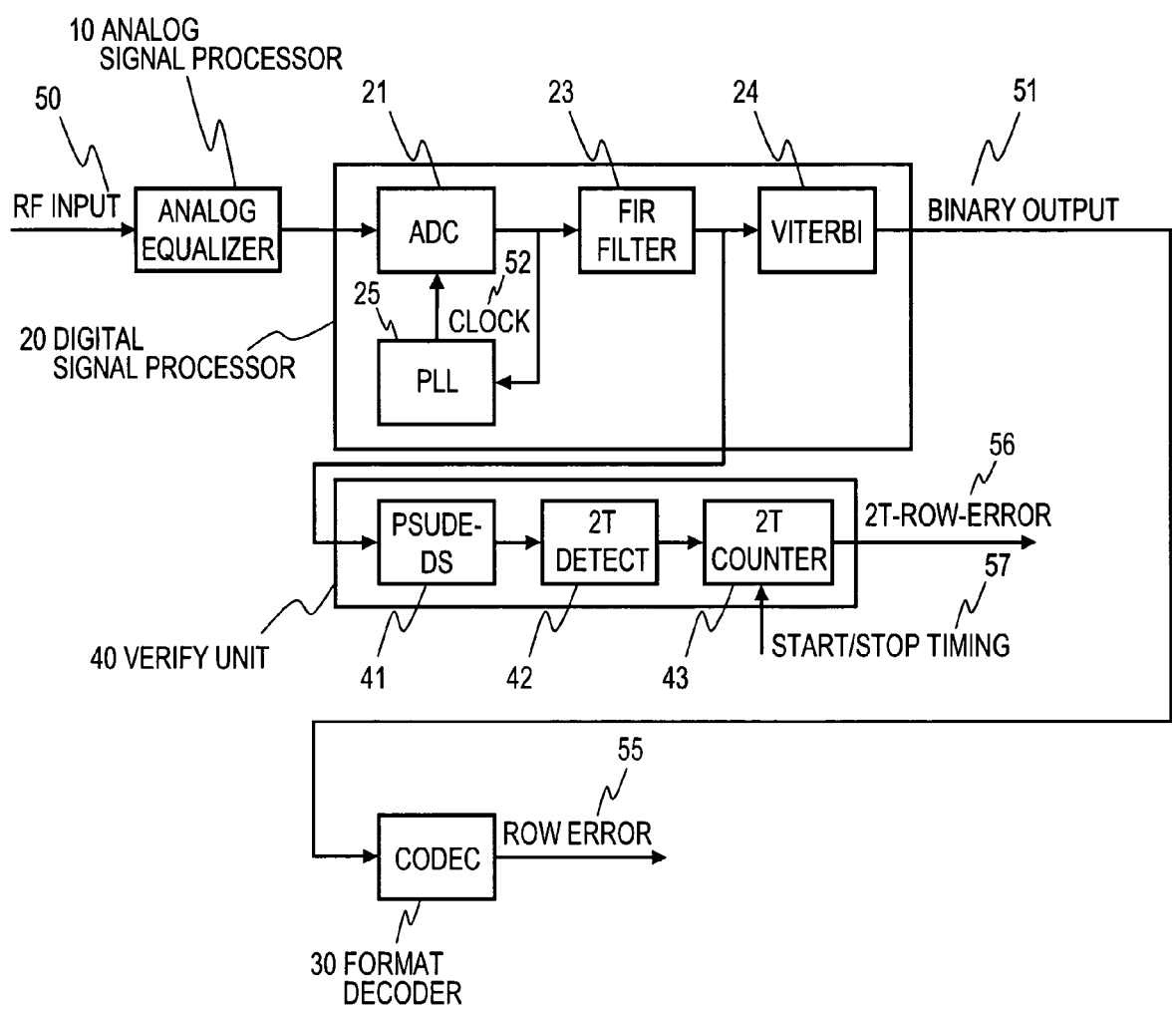
FIG. 27 is a block diagram showing another embodiment of a circuit configuration according to the present invention.

FIG. 27 is a block diagram showing another embodiment of a circuit configuration according to the present invention. In the figure too, like FIG. 26, others than the verify unit 40 are the same as those in FIG. 1. The feature of the present embodiment is that the output signal of the FIR filter 23 is used as the input to the pseudo-direct slice binarizer 41. When a signal is reproduced at a high speed, as stated above, not only the degradation of signal quality caused by the increase of the influence of amplifier noise but also the lowering of the amplitude of the minimum run length signal mainly caused by the group delay and insufficient reproduction band of an I-V conversion circuit must be taken into consideration. Generally, such distortion of a regenerative signal cannot be compensated only with an analog signal processor. However, by installing an FIR filter having a sufficiently large number of taps, it is possible to compensate the distortion of a regenerative signal. Though the experimental results are described later, when an FIR filter is used for the compensation of the distortion of a regenerative signal, it is necessary to input the output into the pseudo-direct slice binarizer 41 as shown in the figure.

Figure 28:
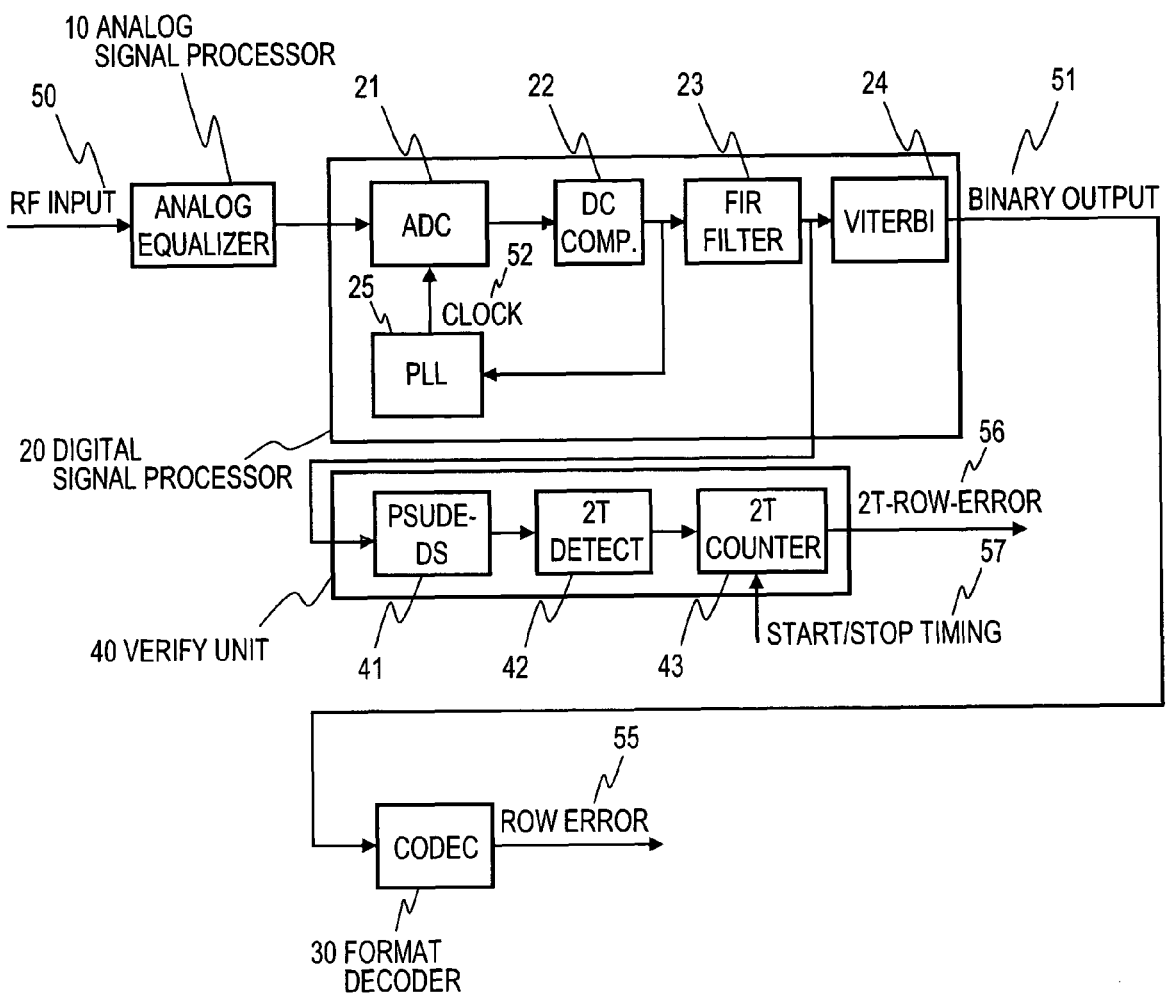
FIG. 28 is a block diagram showing another embodiment of a circuit configuration according to the present invention.

FIG. 28 is a block diagram showing another embodiment of a circuit configuration according to the present invention. The feature of the present embodiment is that a DC compensator 22 is incorporated in the digital signal processor 20. In order to normally operate the pseudo-direct slice binarizer 41 on the basis of the concept shown in FIG. 25, it is necessary to correct the DC component so that the level of the edge of a signal is zero. As methods used for the DC compensator 22, there are the DFB (Duty Feed-Back) method, the JFB (Jitter Feed-Back) method and others.

Figure 29:
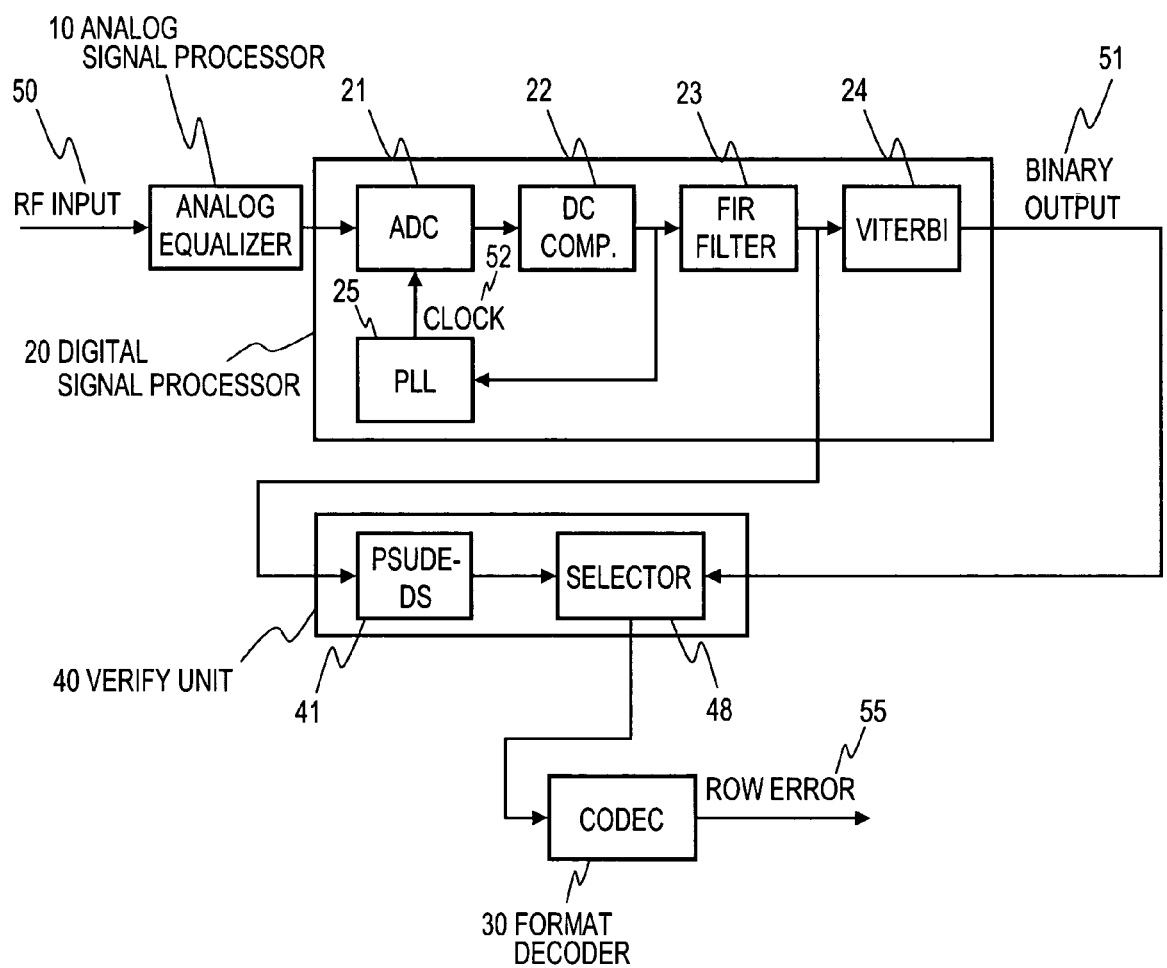
FIG. 29 is a block diagram showing another embodiment of a circuit configuration according to the present invention.

FIG. 29 is a block diagram showing another embodiment of a circuit configuration according to the present invention. The present embodiment represents a circuit configuration to carry out verification without the use of a 2 T count number. To that end, the verify unit 40 comprises a pseudo-direct slice binarizer 41 and a selector 48. In the present embodiment, at the time of verification, the verification judgment is carried out by: using the result of the binarization with the pseudo-direct slice binarizer 41; processing the result with the format decoder 30; and counting the row error number 55. At the time of ordinary reproduction, data is reproduced by using the result of the binarization with the Viterbi decoder 24. The function of the selector 48 is to select the two binarization results and transmit them to the format decoder 30.

Here, although the signal subjected beforehand to equalization processing with the FIR filter 23 is input into the pseudo-direct slice binarizer 41 in the case of FIG. 29, it is also acceptable to use a signal of any state after subjected to AD conversion as long as the signal is in the stare before decoded with the Viterbi decoder 24. In addition, although the pseudo-direct slice method is used here, it is also acceptable to apply binarization in the state of analog by the direct slice method as shown in FIG. 26.

Figure 30:
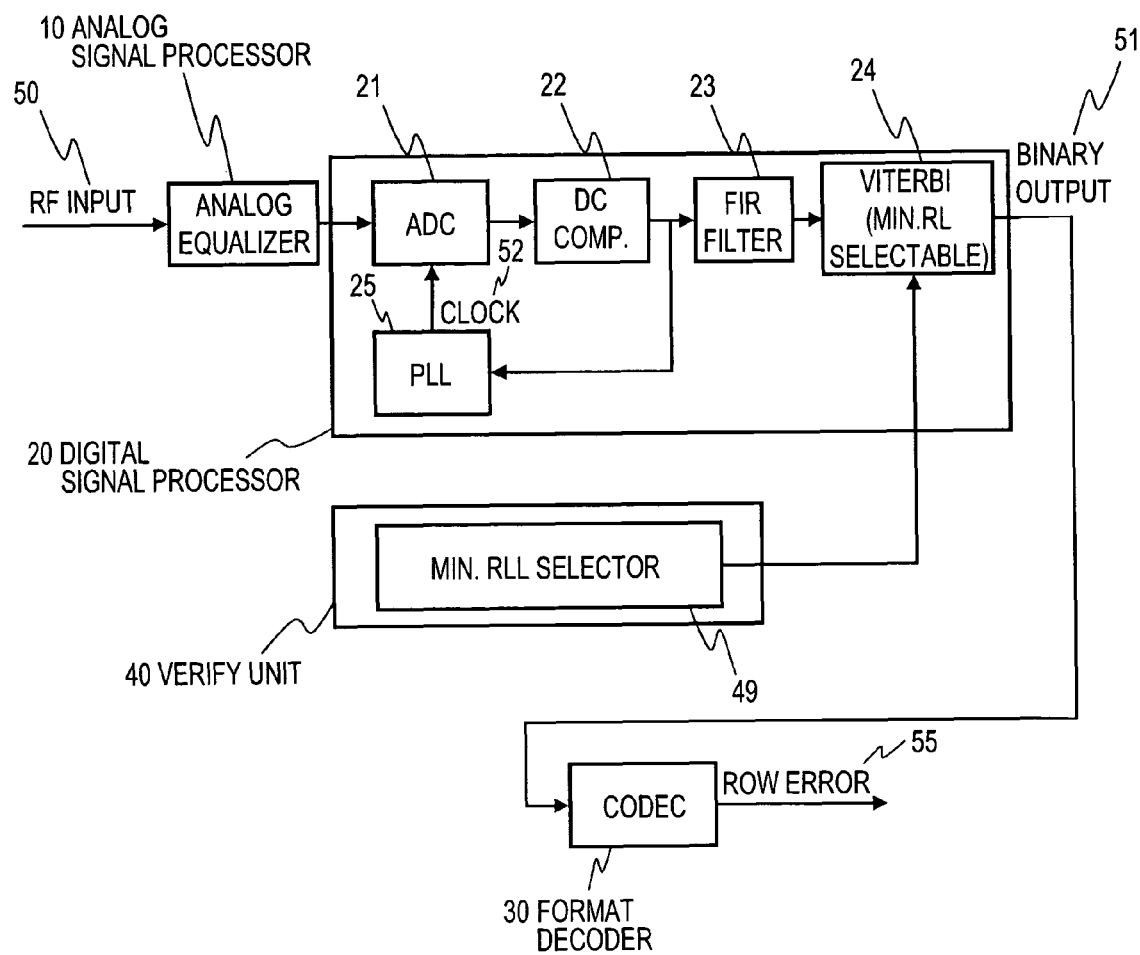
FIG. 30 is a block diagram showing another embodiment of a circuit configuration according to the present invention.

FIG. 30 is a block diagram showing another embodiment of a circuit configuration according to the present invention. The present embodiment represents the configuration in the case of using an aforementioned Viterbi decoder capable of switching the minimum run length. To that end, the Viterbi decoder 24 is provided with the function of switching the minimum run length and the verify unit 40 comprises only a minimum run length selector 49. In the case of a DVD, the minimum run length 3 T is assigned at the time of reproduction and the minimum run length 2 T is assigned at the time of verification. Though the verify unit is described as a block for convenience' sake, such processing can be realized through the instruction from a CPU not shown in the figure.

FIG. 31 is a table summarizing the internal state of a Viterbi decoder capable of switching the minimum run length in accordance with an RLL(2,10) code. Here, PR class is set at PR(3,4,4,3) and the condition of the validity/invalidity of all bit strings of four bits and the target signal level standardized by ±1 are shown. As shown in the figure, in order to set the minimum run length at 2 T at the time of verification, the bit strings "0110" and "1001" may be validated. This can easily be realized by introducing a signal to forcibly overwrite the judgment result from outside at the part of a circuit to judge a state metric value in the Viterbi decoder circuit with regard to the transition corresponding to the bit strings "0110" and "1001."

Next, the experimental results of compensating the distortion of a regenerative signal with the aforementioned FIR filter are described. Here, the compensation of the distortion of a regenerative signal with the FIR filter was studied by: using a sample disk of a 16×-speed DVD-RAM; carrying out record/reproduction with an LM330A evaluator made by ShibaSoku Co., Ltd.; and measuring jitter, an error rate and others with a software simulator having the same function as the circuit shown in FIG. 27. In this case, a digital oscilloscope was used instead of an AD converter.

Figure 32:
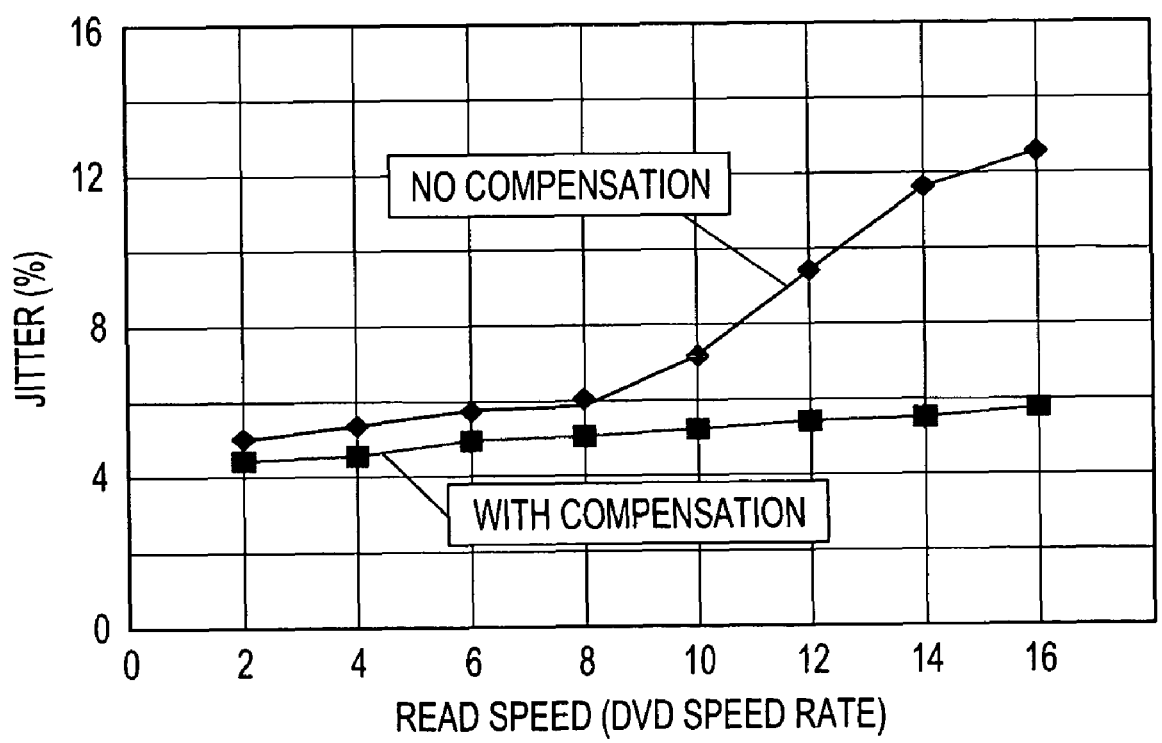
FIG. 32 is a graph showing the results of measuring a jitter value when a track recorded at a double speed is read at a speed in the range from a 2×-speed to a 16×-speed with an NA0.60 evaluator.

FIG. 32 shows the results of measuring a jitter value when a track recorded at a double speed is read at a speed in the range from a 2×-speed to a 16×-speed with an NA0.60 evaluator. The record/reproduction speed increases as the performance of an optical disk drive and a medium improves. However, as repeatedly stated above, it is important to assure reproduction compatibility in order to optimize the shape and power of a recorded pulse. Meanwhile, when a track is reproduced at a high speed, (1) the S/N ratio lowers in proportion to the increase of the influence of amplifier noise and laser noise, and (2) a jitter value increases in proportion to the relative increase of group delay in accordance with the band characteristic of an I-V amplifier and other factors. With regard to the item (1), it is possible to recover the lowering S/N ratio to some extent by introducing the PRML technology. In contrast, with regard to the item (2), there exists a problem from the viewpoint of reproduction compatibility as stated above and, when it is attempted to realize record on a DVD at a speed exceeding an 8×-speed in particular, the problem becomes more serious since it is necessary to introduce rotation control of the CAV mode at least into a part and thus to set the shape and power of the recorded pulse that can realize good record in a wide range of a linear speed. In the figure, the results of the two cases are shown; one is the case of reproducing record under the standard equalization condition of a DVD-RAM and the other is the case of correcting mainly group delay with an FIR filter. Since the standard equalization condition of a DVD-RAM was stipulated on the basis of a double speed, the measurement was carried out here while the equalization booth and the amount were kept constant and the frequency response was changed in proportion to a reproduction speed. In the case of the standard equalization condition, the jitter value that has been about 5% at a double speed exceeds 12% when reproduction is carried out at a 16×-speed. In contrast, when reproduction correction is done with an FIR filter, it is possible to lower the jitter value to 6% or less even when reproduction is carried out at a 16×-speed. In the reproduction correction with the FIR filter used here, used is the same technology as used when the signal reproduced with an NA0.65 device is adaptively subjected to equalization learning using the regenerative signal of an NA0.60 device as the target and focusing on the edge. More specifically, a PR class is produced from a regenerative signal of a double speed that is to be the standard and used as the standard signal, and then each tap coefficient of the FIR filter is determined so that the difference between the regenerative signal and the standard signal is minimum at each reproduction speed.

Here, the frequency response and noise of an I-V amplifier are explained qualitatively. The band of an I-V amplifier is defined on condition that the gain lowers by 3 dB. In the case of a DVD-RAM for example, when it is reproduced at a 16x-speed, the frequency of the repetition signal having the minimum run length (3 T) is about 80 MHz. In order to well reproduce the signal, an I-V amplifier having a band at lest twice as much as 80 MHz is required. The performance of an I-V amplifier varies in accordance with an optical detector, a conversion resistance, and IC process. Generally, the restrictive condition is set so that the product of a band and a gain (may be regarded as the inverse of noise) is nearly constant in the same way as the performance index of a transistor and an operational amplifier. Hence, when an I-V amplifier of a wideband is used, the noise of the amplifier increases. An I-V amplifier for a head used in an optical disk drive is designed and selected so that the performance of the drive is the maximum under such a restrictive condition. In such a case, noise increases when a reproduction band of 160 MHz is secured as mentioned above and thus it is necessary to use an I-V amplifier the band of which is restricted to about 120 MHz in order to obtain good drive performance. The band of the drive used in the experiment here is 110 MHz. In the case of ordinary reproduction of data, an I-V amplifier is well prepared so that such characteristic does not cause a problem. However, it is undesirable to use an I-V amplifier having the performance capable of assuring reproduction compatibility in order to optimize the shape and power of a recorded pulse since the use increases noise and causes the equipment cost to increase as a result. As shown here, by using the reproduction compensation technology according to the present invention, good performance can be obtained through software processing and hence the equipment cost does not increase and it becomes possible to assure the reproduction compatibility. This is one of the largest advantages of the present invention.

Figure 33:
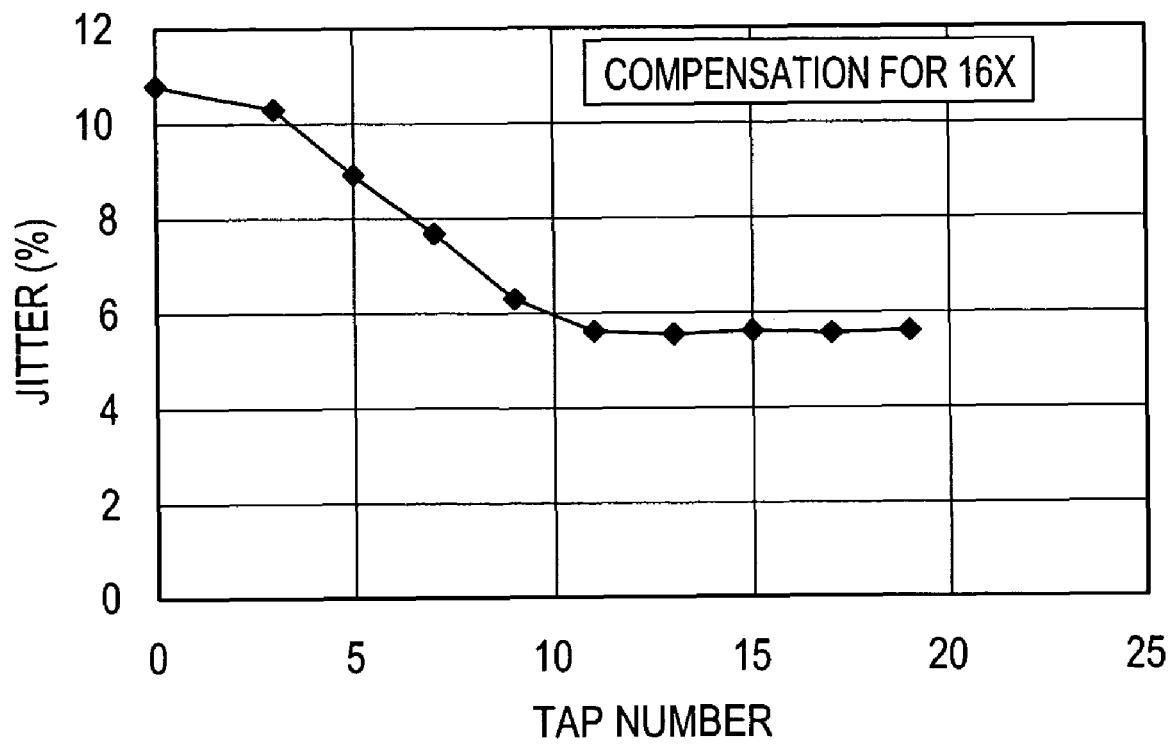
FIG. 33 is a graph showing the experimental results obtained by measuring the relationship between the number of taps of an FIR filter for reproduction correction and a jitter value at a 16×-speed.

FIG. 33 shows the experimental results obtained by measuring the relationship between the number of taps of an FIR filter for reproduction correction and a jitter value at a 16x-speed. The method of measuring each tap coefficient is the same as stated before. From the figure, it is understood that, when the number of taps is five or more, the jitter value begins to decrease conspicuously and is nearly saturated when the number of taps is nine or more. In this case, the number of taps is set at 15 in order to secure a sufficient allowance.

Figure 34:
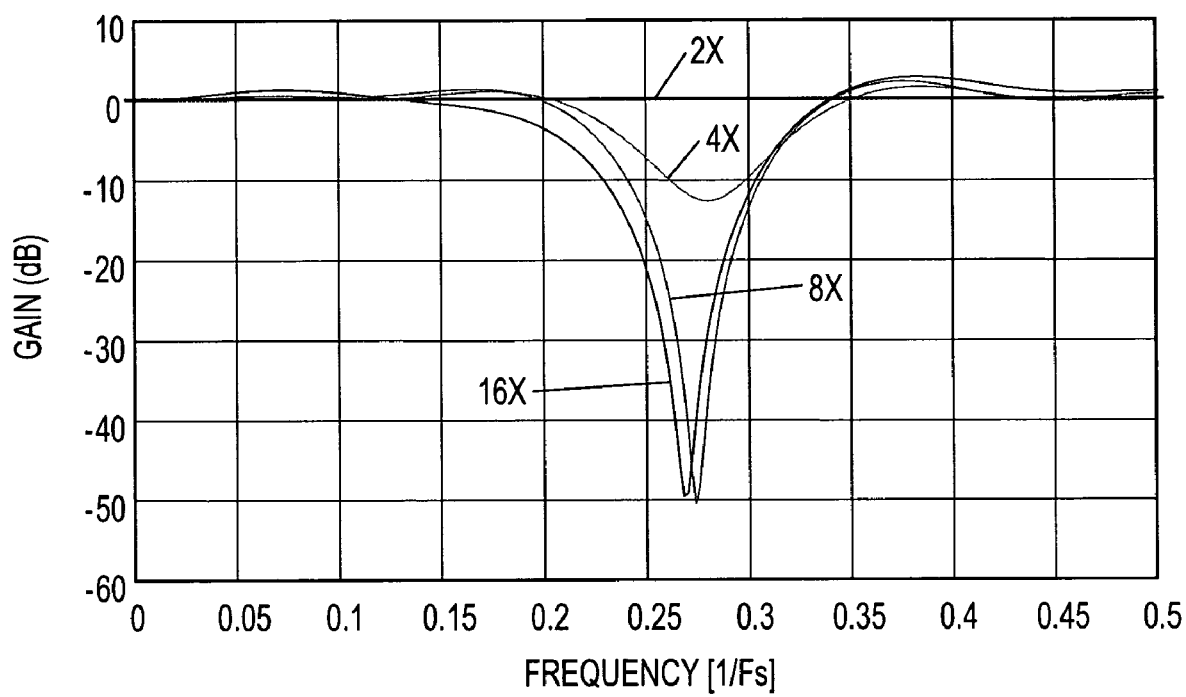
FIG. 34 is a graph showing the frequency response of an FIR filter for reproduction correction.

FIG. 34 shows the frequency response of an FIR filter for reproduction correction. Here, the frequency response of an FIR filter at double, 4x-, 8x-, and 16x-speeds is shown as an example. The FIR filter operates in synchronization with a channel clock and hence the frequency on the lateral axis is standardized with the channel clock. The frequency of the repetition signal of the minimum run length (3 T) is 0.167.

The double speed is used as the standard of record/reproduction and thus an FIR filter has the characteristic of directly passing through a regenerative signal. It has been explained that, more specifically in such a case, only the coefficient of the center tap may be set at "1" and the other coefficients may be set at "0." The frequency response of an FIR filter varies at each speed. The main role of the difference in the frequency response when a frequency is 0.167 or less is to correct group delay and the minimum value of gain observed in the vicinity of the frequency of 0.25 has the effect of a lowpass filter and thus improves the S/N ratio.

Figure 35A:
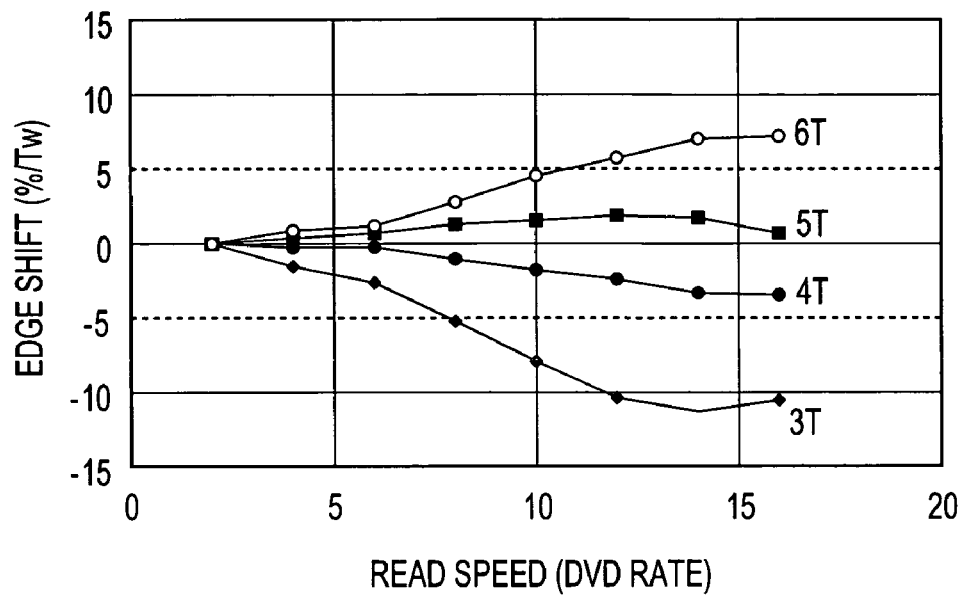
FIGS. 35A and 35B comprise graphs representing the experimental results showing the effect of an FIR filter for reproduction correction on the suppression of group delay.
Figure 35B:
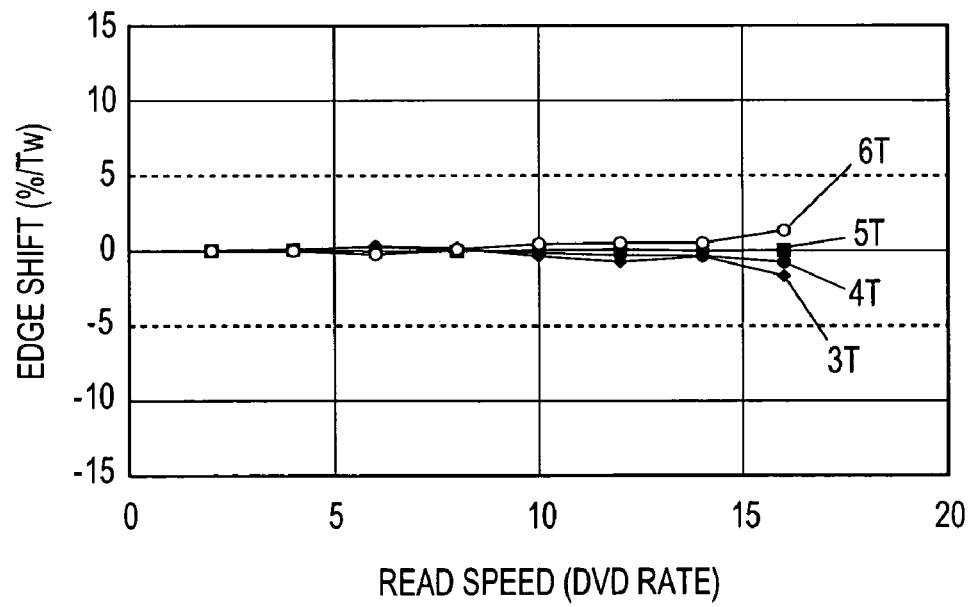

FIGS. 35A and 35B represent experimental results showing the effect of an FIR filter for reproduction correction on the suppression of group delay. FIG. 35A shows the results under the standard equalization condition. Each value of edge shift on the vertical axis is the value obtained by averaging the measured values of edge shift at each of the aforementioned 4x4 patterns with each of the mark lengths 3 T, 4 T, 5 T and 6 T. It is understood that, edge shift is about −10% in the case of 3 T and about +7% in the case of 6 T at 16x-speed in comparison with the standard of a double speed. Those values do not satisfy the aforementioned condition for record/reproduction compatibility which is an edge shift of 5% or less. In contrast, when reproduction correction is applied with an FIR filter, as seen in FIG. 35B, the values of the edge shift are nearly constant in the range from the double speed to the 16x-speed and satisfy the aforementioned condition for reproduction compatibility which is an edge shift of 5% or less.

Figure 36:
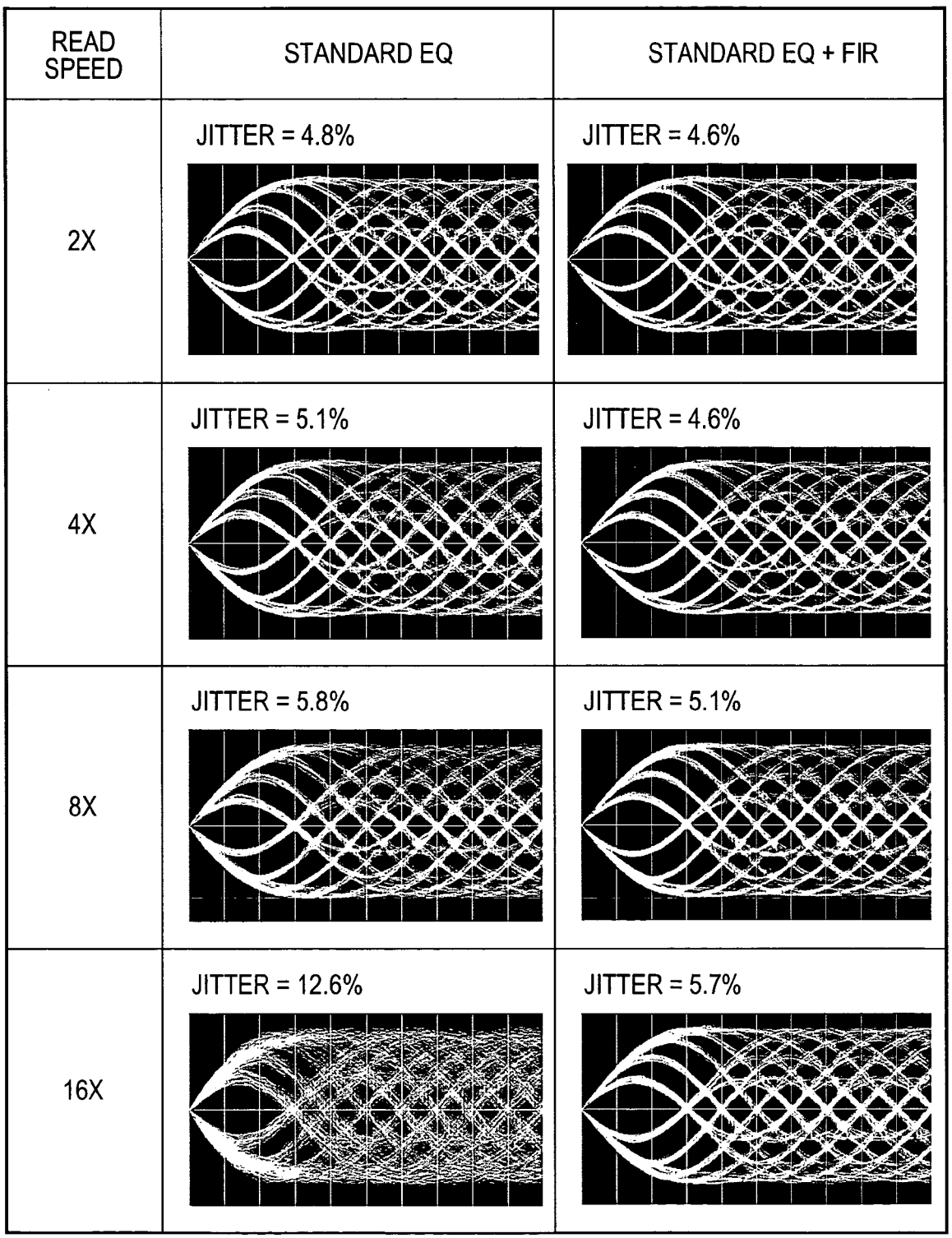
FIG. 36 is a table summarizing the relationship between an eye pattern and a jitter value at each speed in the cases of applying and not applying reproduction correction.

FIG. 36 is a table summarizing the relationship between an eye pattern and a jitter value at each speed in the cases of applying and not applying reproduction correction. It is understood that the effect of improving signal quality is conspicuous particularly at the 16x-speed.

FIG. 37 is a table summarizing the tap coefficients of an FIR filter for reproduction correction at each speed. Here, the tap coefficients are standardized so that the DC gain is equal to one.

FIG. 38 is a table showing the results of measuring a jitter value and a bit error rate at a 6x-speed and a 16x-speed. PR(3,4,4,3)ML is used for the measurement of the bit error rate. A good bit error rate of $10^{-6}$ or lower is obtained even after the overwrite of 10 times.

Lastly, the region wherein the number of 2 T-row-error is counted is explained. Abbreviations are not particularly explained since they are publicly known through specifications and others.

Figure 39:
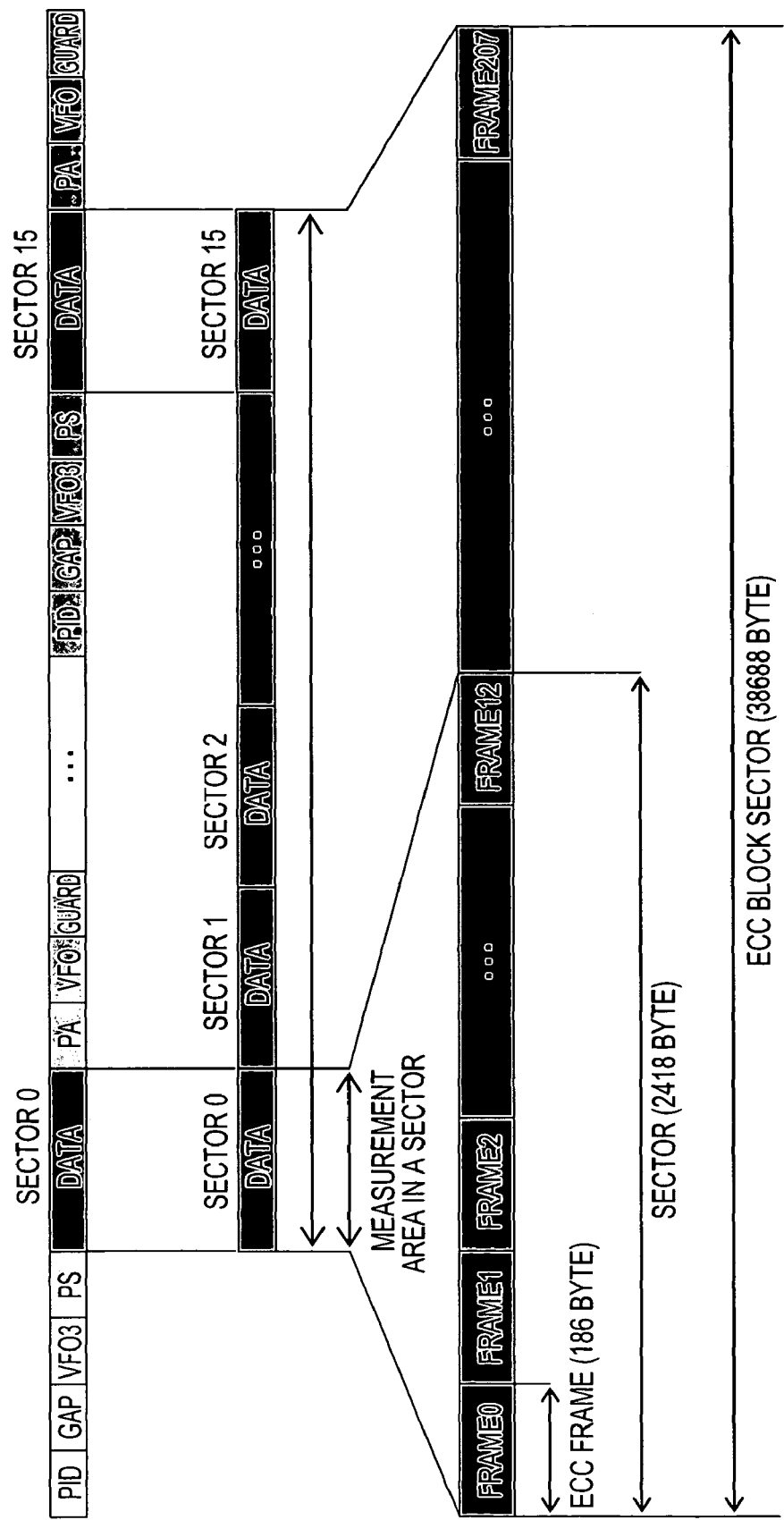
FIG. 39 is a schematic illustration showing a data block configuration of a DVD-RAM.

FIG. 39 is a schematic illustration showing a data block configuration of a DVD-RAM. The data block has a user data capacity of 32 KB and comprises 16 sectors consisting of PID and data. One data sector has a physical length corresponding to 2,418 bytes and comprises 13 PI frames. Each PI frame (ECC frame) has the physical length of 186 bytes (182 bytes when the sync is excluded). The region of the measurement of 2 T count conforming to a PI frame is a region corresponding to continuous 186 bytes (2,976 Tw). In this case, the counting is originally carried out in the region excluding the sync. However, for the simplification of the circuit, the counting may be carried out in the whole region of 186 bytes. The error of the region length is within ±3% and hence can be ignored.

Figure 40:
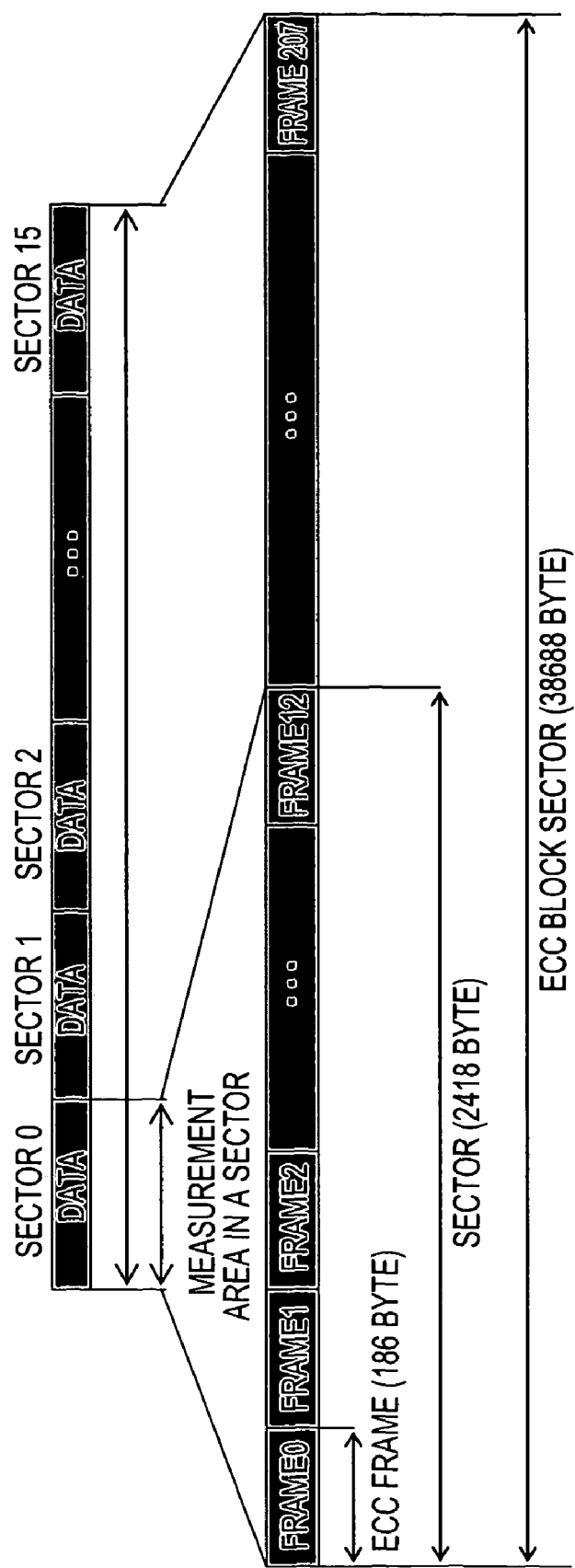
FIG. 40 is a schematic illustration showing a data block configuration of a DVD±R/RW.

FIG. 40 is a schematic illustration showing a data block configuration of a DVD±R/RW. The data block has a user data capacity of 32 KB and PID does not exist. This case is the same as the case of a DVD-RAM in the fact that the data block comprises 16 sectors, also the logical structure of an ECC frame is completely identical, and there are 208 (13×16) ECC frames in the block. The fact that the region of the measurement of 2 T count conforming to a PI frame is a region corresponding to continuous 186 bytes and the number of the PI frames is 208 is also the same.

FIG. 41 comprises tables showing an example of the specification of a 2 T-row-error counter. In the specification shown in the figure, it is possible to: measure the values for obtaining the results shown in FIG. 18, such as the 2 T count number at each sector, the total 2 T count number in a block, the 2

T-row-error number (the number of frames having the measured value not less than the threshold value) and the like, except the measured values in the PI frames; and quantitatively measure defects and the difference of the measured values of land/groove at each sector.

This invention also includes the following characteristics.

An IC circuit according to the present invention is characterized by being provided with:

a digital signal processor to digitalize an analog signal, to which an error correction code is added, conforming to a run length limitation coding rule, decode the digitalized signal, and output the binarized data signal; and a verify unit to be provided with a measuring instrument to count from the signal before decoded the number of data having the length of $(L_{min}-1)$ which is shorter than the minimum run length $L_{min}$ of the run length limited code and to output the result obtained by counting the data number for each of the error correction frames of the error correction code.

Further, an IC circuit according to the present invention is characterized in that the verify unit: is provided with a binarizer to binarize the digitalized signal; and counts the data number from the binarized signal.

Furthermore, an IC circuit according to the present invention is characterized in that the verify unit: is provided with a direct slice binarizer to binarize the analog signal; and counts the data number from the binarized signal.

Yet further, an IC circuit according to the present invention is characterized in that the digital signal processor: is provided with an AD converter to convert the analog signal to a digital signal for each clock, an FIR filter to digitally equalize the digital signal, and a Viterbi decoder to decode the digitally equalized signal; and inputs either the signal after digitalized with the AD converter and before input to the FIR filter or the signal after equalized with the FIR filter and before input to the Viterbi decoder to the binarizer of the verify unit.

Yet further, an IC circuit according to the present invention is characterized in that the digital signal processor is provided with: an AD converter to convert the analog signal to a digital signal for each clock; a DC corrector to correct the DC component of the digital signal; an FIR filter to digitally equalize the digital signal the DC component of which is corrected; and a Viterbi decoder to binarize the digitally equalized signal.

Yet further, an IC circuit according to the present invention is characterized by being provided with: a digital signal processor to digitalize an analog signal, decode the digitalized signal, and output the binarized data signal; a binarizer to binarize the signal before decoded; and a selector to select a binarized data signal after decoded at the digital signal processor and the binarized signal produced by binarizing the signal before decoded, wherein the selector selects the binarized signal produced by binarizing the signal before decoded at the time of verification and the binarized signal produced by binarizing the signal after decoded at the time of user data reproduction.

Yet further, an IC circuit according to the present invention is characterized by provided with: an AD converter to digitalize an analog signal conforming to a run length limitation coding rule; and a Viterbi decoder which decodes the digitalized signal and is capable of switching from the minimum run length $L_{min}$ of the run length limited code to a length of $(L_{min}-1)$ which is shorter than the minimum run length $L_{min}$ and vice versa, wherein the Viterbi decoder is designed so as to select the length $(L_{min}-1)$ at the time of verification and the length $L_{min}$ at the time of user data reproduction.

Third Embodiment (Optical Disk Drive)

Figure 42:
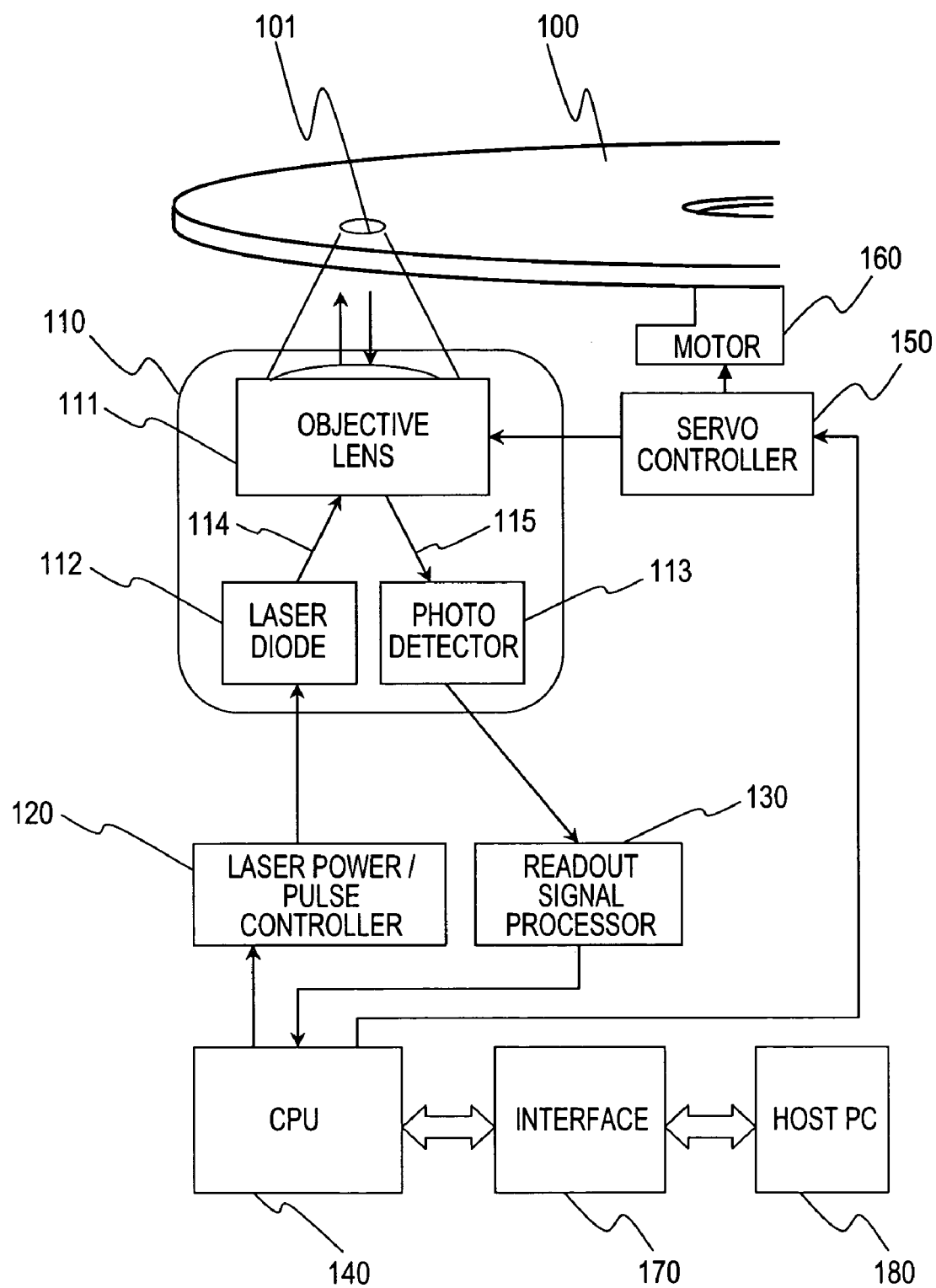
FIG. 42 is a view schematically showing an example of the configuration of an optical disk drive according to the present invention.

FIG. 42 is a view schematically showing an example of the configuration of an optical disk drive according to the present invention. An optical disk medium 100 is driven by a motor 160. At the time of reproduction, a laser power/pulse controller 120 controls the current supplied to a semiconductor laser 112 in an optical head 110 so that a light intensity directed by a CPU 140 can be secured and laser beam 114 is generated. The laser beam 114 is focused with an objective lens 111 and forms a light spot 101 on the optical disk medium 100. The reflected light 115 from the light spot 101 is detected with a photo-detector 113 through the objective lens 111. The photo-detector comprises a plurality of divided light-detecting components. A readout signal processor 130 reproduces information recorded on the optical disk medium 100 with the signal detected with the optical head 110. At the time of record, the laser power/pulse controller 120 converts prescribed recorded data into prescribed record pulsed current and controls pulsed light so as to be emitted from the semiconductor laser 112. The decoding circuit of a regenerative signal according to the present invention shown in FIG. 1 is incorporated into the readout signal processor 130. Such a configuration can realize an optical disk drive allowing reproduction compatibility in the PRML method and the direct slice method.

This invention also includes the following characteristics.

An optical disk drive, capable of recording and reproducing data on an optical disk medium, according to the present invention is characterized by having the means of:

making a reproduction speed variable; and changing the judgment standard of the quality of the recorded data in accordance with the reproduction speed.

Further, an optical disk drive according to the present invention is characterized by having the means of:

recording a data block on an optical disk medium with a run length limited code after an error correction code is added to data;

obtaining a regenerative signal by optically reproducing the recorded data block;

obtaining a binarized data signal by binarizing the regenerative signal;

obtaining a byte data string by decoding the binarized data signal with the run length limited code;

after reconfiguring the byte data string into error correction frames, applying error correction processing with a Reed-Solomon code, and counting a corrected byte number $N_{frm}$ for each of the error correction frames;

counting the total number of the error correction frames wherein the corrected byte number $N_{frm}$ is a first threshold value or more in the data block as an error frame number $N_{tot}$; and judging that the quality of the data block is insufficient when the error frame number $N_{tot}$ is a second threshold value or more, wherein the quality of the recorded data is judged in accordance with a reproduction speed by changing at least one of the first and second threshold values in accordance with the reproduction speed.

Furthermore, an optical disk drive according to the present invention is characterized by having the means of:

recording a data block on an optical disk medium with a run length limited code after an error correction code is added to data;

obtaining a regenerative signal by optically reproducing the recorded data block;

obtaining a first binarized data signal by binarizing the regenerative signal by the Viterbi decoding method;

obtaining a byte data string by decoding the first binarized data signal with the run length limited code;

after reconfiguring the byte data string into error correction frames, applying error correction processing with a Reed-Solomon code, and obtaining error correction information;

obtaining a second binarized data signal by binarizing the regenerative signal by the direct slice decoding method; and obtaining from the second binarized data signal the run length error incidence information which is the number of the incidence of the data having at least the length of ($L_{min}$–1) out of the lengths shorter than the minimum run length $L_{min}$ of the run length limited code, wherein the quality of the recorded data is judged on the basis of the error correction information and the run length error incidence information.

Yet further, an optical disk drive according to the present invention is characterized by having the means of:

recording a data block on an optical disk medium with a run length limited code after an error correction code is added to data;

obtaining a regenerative signal by optically reproducing the recorded data block;

obtaining a first binarized data signal by binarizing the regenerative signal by the Viterbi decoding method;

obtaining a byte data string by decoding the first binarized data signal with the run length limited code;

after reconfiguring the byte data string into error correction frames, applying error correction processing with a Reed-Solomon code, and counting a corrected byte number $N_{frm}$ for each of the error correction frames;

counting the total number of the error correction frames wherein the corrected byte number $N_{frm}$ is a first threshold value or more in the data block as an error frame number $N_{tot}$;

obtaining a second binarized data signal by binarizing the regenerative signal by the direct slice decoding method;

counting from the second binarized data signal the number of the incidence of the data having at least the length of ($L_{min}$–1) out of the lengths shorter than the minimum run length $L_{min}$ of the run length limited code as a run length error incidence number $E_{frm}$ for each zone having the same length as the error correction frame;

counting the total number of the zones wherein the run length error incidence number $E_{frm}$ is a second threshold value or more in the data block as a run length error frame number $E_{tot}$; and judging that the quality of the data block is insufficient when the sum of the error frame number $N_{tot}$ and the run length error frame number $E_{tot}$ is a third threshold value or more, wherein the quality of the recorded data is judged in accordance with a reproduction speed by changing at least one of the first to third threshold values in accordance with the reproduction speed.

Yet further, an optical disk drive according to the present invention is characterized by having the means of:

recording a data block on an optical disk medium with a run length limited code after an error correction code is added to data;

obtaining a regenerative signal by optically reproducing the recorded data block;

obtaining a first binarized data signal by binarizing the regenerative signal by the Viterbi decoding method;

obtaining a byte data string by decoding the first binarized data signal with the run length limited code;

after reconfiguring the byte data string into error correction frames, applying error correction processing with a Reed-Solomon code, and counting a corrected byte number $N_{frm}$ for each of the error correction frames;

counting the total number of the error correction frames wherein the corrected byte number $N_{frm}$ is a first threshold value or more in the data block as an error frame number $N_{tot}$;

exercising a first judgment wherein the result is regarded as "true" when the error frame number $N_{tot}$ is a second threshold value or more;

obtaining a second binarized data signal by binarizing the regenerative signal by the direct slice decoding method;

counting from the second binarized data signal the number of the incidence of the data having at least the length of ($L_{min}$–1) out of the lengths shorter than the minimum run length $L_{min}$ of the run length limited code as a run length error incidence number $E_{frm}$ for each zone having the same length as the error correction frame;

counting the total number of the zones wherein the run length error incidence number $E_{frm}$ is a third threshold value or more in the data block as a run length error frame number $E_{tot}$;

exercising a second judgment wherein the result is regarded as "true" when the run length error frame number $E_{tot}$ is a fourth threshold value or more; and judging that the quality of the data block is insufficient when at least one of the first and second judgment is "true,"

wherein the quality of the recorded data is judged in accordance with a reproduction speed by changing at least one of the first to fourth threshold values in accordance with the reproduction speed.

Yet further, an optical disk drive according to the present invention is characterized by having the means of:

recording a data block on an optical disk medium with a run length limited code after an error correction code is added to data;

obtaining a regenerative signal by optically reproducing the recorded data block;

obtaining a binarized data signal by binarizing the regenerative signal by the Viterbi decoding method with a Viterbi decoder;

obtaining a byte data string by decoding the binarized data signal with the run length limited code;

after reconfiguring the byte data string into error correction frames, applying error correction processing with a Reed-Solomon code, and counting a corrected byte number $N_{frm}$ for each of the error correction frames;

counting the total number of the error correction frames wherein the corrected byte number $N_{frm}$ is a first threshold value or more in the data block as an error frame number $N_{tot}$; and judging that the quality of the data block is insufficient when the error frame number $N_{tot}$ is a second threshold value or more, wherein the Viterbi decoder to which the Viterbi decoding method is applied is, as the internal state, provided with a bit string containing the data string having at least the length of ($L_{min}$–1) out of the lengths shorter than the minimum run length $L_{min}$ of the run length limited code, has the function of switching the validity and invalidity of the internal state which does not satisfy the run length limitation, and, when the quality of the recorded data block is judged, validates the internal state which does not satisfy the run length limitation, and the quality of the recorded data is judged in accordance with a reproduction speed by changing at least one of the first and second threshold values in accordance with the reproduction speed.

The present invention is used for an optical disk drive of a large capacity.

What is claimed is:

1. An information reproduction method comprising the processes of:
   recording data on an optical disk; and
   changing the judgment standard of the quality of said recorded data in accordance with a reproduction speed when said recorded data is reproduced;
   in which:
   said process of recording data is a process of recording a data block on an optical disk medium with a run length limited code after an error correction code is added to the data; and
   said process of changing the judgment standard comprises the processes of:
   (1) obtaining a regenerative signal by optically reproducing said recorded data block;
   (2) obtaining a binarized data signal by binarizing said regenerative signal;
   (3) obtaining a byte data string by decoding said binarized data signal with said run length limited code;
   (4) after reconfiguring said byte data string into error correction frames, applying error correction processing with a Reed-Solomon code, and counting a corrected byte number $N_{frm}$ for each of said error correction frames;
   (5) counting the total number of the error correction frames wherein said corrected byte number $N_{frm}$ is greater than or equal to a first threshold value in said data block as an error frame number $N_{tot}$; and
   (6) judging that the quality of said data block is insufficient when said error frame number $N_{tot}$ is greater than or equal to a second threshold value,
   wherein the quality of the recorded data is judged in accordance with a reproduction speed by changing at least one of said first and second threshold values in accordance with the reproduction speed.

2. A method of reproducing information comprising the processes of:
   recording a data block on an optical disk medium with a run length limited code after an error correction code is added to data;
   obtaining a regenerative signal by optically reproducing said recorded data block;
   obtaining a first binarized data signal by binarizing said regenerative signal by a Viterbi decoding method;
   obtaining a byte data string by decoding said first binarized data signal with said run length limited code;
   after reconfiguring said byte data string into error correction frames, applying error correction processing with a Reed-Solomon code, and obtaining error correction information;
   obtaining a second binarized data signal by binarizing said regenerative signal by a direct slice decoding method; and
   obtaining from said second binarized data signal the run length error incidence information which is the number of the incidence of the data having at least the length of $(L_{min}-1)$ out of the lengths shorter than the minimum run length $L_{min}$ of said run length limited code,
   wherein the quality of the recorded data is judged on the basis of said error correction information and said run length error incidence information.

3. An information reproduction method comprising the processes of:
   recording data on an optical disk including a plurality of zones; and
   changing the judgment standard of the quality of said recorded data in accordance with a reproduction speed when said recorded data is reproduced;
   in which:
   said process of recording data is a process of recording a data block on an optical disk medium with a run length limited code after an error correction code is added to the data; and
   said process of changing the judgment standard comprises the processes of:
   (1) obtaining a regenerative signal by optically reproducing said recorded data block;
   (2) obtaining a first binarized data signal by binarizing said regenerative signal by a Viterbi decoding method;
   (3) obtaining a byte data string by decoding said first binarized data signal with said run length limited code;
   (4) after reconfiguring said byte data string into error correction frames, applying error correction processing with a Reed-Solomon code, and counting a corrected byte number $N_{frm}$ for each of said error correction frames;
   (5) counting the total number of the error correction frames wherein said corrected byte number $N_{frm}$ is greater than or equal to a first threshold value in said data block as an error frame number $N_{tot}$;
   (6) obtaining a second binarized data signal by binarizing said regenerative signal by a direct slice decoding method;
   (7) counting from said second binarized data signal the number of the incidence of the data having at least the length of $(L_{min}-1)$ out of the lengths shorter than the minimum run length $L_{min}$ of said run length limited code as a run length error incidence number $E_{frm}$ for each zone having the same length as said error correction frame;
   (8) counting the total number of said zones wherein said run length error incidence number $E_{frm}$ is greater than or equal to a second threshold value in said data block as a run length error frame number $E_{tot}$; and
   (9) judging that the quality of said data block is insufficient when the sum of said error frame number $N_{tot}$ and said run length error frame number $E_{tot}$ is greater than or equal to a third threshold value,
   wherein the quality of the recorded data is judged in accordance with a reproduction speed by changing at least one of said first to third threshold values in accordance with the reproduction speed.

4. An information reproduction method comprising the processes of:
   recording data on an optical disk including a plurality of zones; and
   changing the judgment standard of the quality of said recorded data in accordance with a reproduction speed when said recorded data is reproduced;
   in which:
   said process of recording data is a process of recording a data block on an optical disk medium with a run length limited code after an error correction code is added to the data; and
   said process of changing the judgment standard comprises the processes of:

(1) obtaining a regenerative signal by optically reproducing said recorded data block;
(2) obtaining a first binarized data signal by binarizing said regenerative signal by a Viterbi decoding method;
(3) obtaining a byte data string by decoding said first binarized data signal with said run length limited code;
(4) after reconfiguring said byte data string into error correction frames applying error correction processing with a Reed-Solomon code, and counting a corrected byte number $N_{frm}$ for each of said error correction frames;
(5) counting the total number of the error correction frames wherein said corrected byte number $N_{frm}$ is greater than or equal to a first threshold value in said data block as an error frame number $N_{tot}$;
(6) exercising a first judgment wherein the result is regarded as "true" when said error frame number $N_{tot}$ is greater than or equal to a second threshold value;
(7) obtaining a second binarized data signal by binarizing said regenerative signal by a direct slice decoding method;
(8) counting from said second binarized data signal the number of the incidence of the data having at least the length of ($L_{min}-1$) out of the lengths shorter than the minimum run length $L_{min}$ of said run length limited code as a run length error incidence number $E_{frm}$ for each zone having the same length as said error correction frame;
(9) counting the total number of said zones wherein said run length error incidence number $E_{frm}$ is greater than or equal to a third threshold value in said data block as a run length error frame number $E_{tot}$;
(10) exercising a second judgment wherein the result is regarded as "true" when said run length error frame number $E_{tot}$ is greater than or equal to a fourth threshold value or more; and
(11) judging that the quality of said data block is insufficient when at least one of said first and second judgment is "true,"
wherein the quality of the recorded data is judged in accordance with a reproduction speed by changing at least one of said first to fourth threshold values in accordance with the reproduction speed.

5. An information reproduction method comprising the processes of:
recording data on an optical disk; and
changing the judgment standard of the quality of said recorded data in accordance with a reproduction speed when said recorded data is reproduced;
in which:
said process of recording data is a process of recording a data block on an optical disk medium with a run length limited code after an error correction code is added to the data; and
said process of changing the judgment standard comprises the processes of:
(1) obtaining a regenerative signal by optically reproducing said recorded data block;
(2) obtaining a binarized data signal by binarizing said regenerative signal by a Viterbi decoding method;
(3) obtaining a byte data string by decoding said binarized data signal with said run length limited code;
(4) after reconfiguring said byte data string into error correction frames, applying error correction processing with a Reed-Solomon code, and counting a corrected byte number $N_{frm}$ for each of said error correction frames;
(5) counting the total number of the error correction frames wherein said corrected byte number $N_{frm}$ is greater than or equal to a first threshold value in said data block as an error frame number $N_{tot}$; and
(6) judging that the quality of said data block is insufficient when said error frame number $N_{tot}$ is greater than or equal to a second threshold value,
wherein said Viterbi decoding method is, as the internal state, provided with a bit string containing the data string having at least the length of ($L_{min}-1$) out of the lengths shorter than the minimum run length $L_{min}$ of said run length limited code and the quality of the recorded data is judged in accordance with a reproduction speed by changing at least one of said first and second threshold values in accordance with the reproduction speed.

* * * * *